United States Patent
Lin

(10) Patent No.: US 11,593,008 B2
(45) Date of Patent: *Feb. 28, 2023

(54) CONTROL METHOD FOR FLASH MEMORY CONTROLLER AND ASSOCIATED FLASH MEMORY CONTROLLER AND STORAGE DEVICE

(71) Applicant: Silicon Motion, Inc., Hsinchu County (TW)

(72) Inventor: Ching-Hui Lin, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,401

(22) Filed: Aug. 5, 2021

(65) Prior Publication Data

US 2022/0214808 A1 Jul. 7, 2022

(30) Foreign Application Priority Data

Jan. 7, 2021 (TW) ................................. 110100581

(51) Int. Cl.
*G06F 3/06* (2006.01)

(52) U.S. Cl.
CPC ............ *G06F 3/064* (2013.01); *G06F 3/0605* (2013.01); *G06F 3/0652* (2013.01); *G06F 3/0659* (2013.01); *G06F 3/0679* (2013.01)

(58) Field of Classification Search
CPC ...... G06F 3/064; G06F 3/0605; G06F 3/0652; G06F 3/0659; G06F 3/0679; G06F 2212/1004; G06F 2212/1016; G06F 2212/1044; G06F 2212/7202; G06F 12/0246

See application file for complete search history.

(56) References Cited

U.S. PATENT DOCUMENTS

| | | | |
|---|---|---|---|
| 8,621,177 B2 | 12/2013 | Gorobets | |
| 9,703,486 B2 | 7/2017 | Yano et al. | |
| 9,811,462 B2* | 11/2017 | Kanno | G06F 3/0619 |
| 9,830,079 B2* | 11/2017 | Kanno | G06F 3/0604 |
| 2018/0088805 A1* | 3/2018 | Kanno | G06F 12/10 |
| 2019/0332316 A1* | 10/2019 | Kanno | G06F 3/0679 |
| 2020/0089407 A1* | 3/2020 | Baca | G06F 3/0635 |
| 2020/0167274 A1 | 5/2020 | Bahirat | |

(Continued)

FOREIGN PATENT DOCUMENTS

| | | |
|---|---|---|
| CN | 111124305 A | 5/2020 |
| CN | 111694515 A | 9/2020 |

(Continued)

*Primary Examiner* — Francisco A Grullon
(74) *Attorney, Agent, or Firm* — Winston Hsu

(57) ABSTRACT

The present invention provides a control method of a flash memory controller, wherein the flash memory controller is configured to access a flash memory module, and the control method includes the steps of: receiving a settling command from a host device to configure a portion space of the flash memory module as a zoned namespace; receiving a write command from the host device to write data corresponding a first zone into a plurality of blocks of the flash memory module, wherein an access mode chose by the flash memory controller is determined based on a size of each zone and a size of each block.

20 Claims, 30 Drawing Sheets

(56) References Cited

U.S. PATENT DOCUMENTS

| | | |
|---|---|---|
| 2020/0356307 A1 | 11/2020 | Subbarao |
| 2020/0409601 A1* | 12/2020 | Helmick ............... G06F 3/0659 |
| 2021/0255803 A1* | 8/2021 | Kanno ................ G06F 3/0656 |
| 2022/0206696 A1* | 6/2022 | Gao .................... G06F 3/0679 |

FOREIGN PATENT DOCUMENTS

| | | |
|---|---|---|
| JP | 2007-517335 A | 6/2007 |
| JP | 2010-521718 A | 6/2010 |

\* cited by examiner

| Starting logical address of the zone | Physical block address |
|---|---|
| Z1_LBA_S | PBA3, PBA7, PBA8 |
| Z3_LBA_S | PBA12, PBA99, PBA6 |
| ... | ... |

FIG. 7A

| Logical address | Physical block address |
|---|---|
| Z1_LBA_S | PBA3 |
| Z1_LBA_S+y | PBA7 |
| Z1_LBA_S+2*y | PBA8 |
| Z3_LBA_S | PBA12 |
| Z3_LBA_S+y | PBA99 |
| Z3_LBA_S+2*y | PBA6 |
| .... | .... |

| Logical address | Physical block address |
| --- | --- |
| Z0_LBA_S | |
| Z0_LBA_S+y | |
| Z0_LBA_S+2*y | |
| Z1_LBA_S | PBA3 |
| Z1_LBA_S+y | PBA7 |
| Z1_LBA_S+2*y | PBA8 |
| Z2_LBA_S | |
| Z2_LBA_S+y | |
| Z2_LBA_S+2*y | |
| Z3_LBA_S | PBA12 |
| Z3_LBA_S+y | PBA99 |
| Z3_LBA_S+2*y | PBA6 |
| ⋮ | ⋮ |

FIG. 7D

| Logical address | Physical block address |
|---|---|
| Z1_LBA_S | PBA3 |
| Z1_LBA_S+y | PBA7 |
| Z1_LBA_S+2*y | PBA8 |
| Z3_LBA_S | PBA12 |
| Z3_LBA_S+y | PBA99 |
| Z3_LBA_S+2*y | PBA8 |
| ... | ... |

1100A

| Logical address | Physical block address and physical page address |
|---|---|
| Z1_LBA_S+2*y (Z1_2) | PBA8, P1 |
| Z3_LBA_S+2*y (Z3_2) | PBA8, P120 |
| ... | ... |

| Logical address | Physical block address |
|---|---|
| Z0_LBA_S | |
| Z0_LBA_S+y | |
| Z0_LBA_S+2*y | PBA3 |
| Z1_LBA_S | PBA7 |
| Z1_LBA_S+y | PBA8 |
| Z1_LBA_S+2*y | |
| Z2_LBA_S | |
| Z2_LBA_S+y | PBA12 |
| Z2_LBA_S+2*y | PBA99 |
| Z3_LBA_S | PBA6 |
| Z3_LBA_S+y | |
| Z3_LBA_S+2*y | |
| .... | .... |

1100B

| Logical address | Physical block address |
|---|---|
| Z0_LBA_S+2*y | |
| Z1_LBA_S+2*y | PBA8, P1 |
| Z2_LBA_S+2*y | |
| Z3_LBA_S+2*y | PBA8, P120 |
| .... | .... |

| Logical address | Physical block address and physical page address | Completion indicator |
|---|---|---|
| Z1_LBA_S+2*y (Z1_2) | PBA8, P1 | 1 |
| Z3_LBA_S+2*y (Z3_2) | PBA8, P120 | 0 |
| .... | .... | .... |

1230

(b)

| Logical address | Physical block address and physical page address | Completion indicator |
|---|---|---|
| Z1_LBA_S+2*y (Z1_2) | PBA8, P1 | 0 |
| Z3_LBA_S+2*y (Z3_2) | PBA15, P1 | 0 |
| .... | .... | .... |

| Block | Physical block address |
|---|---|
| Z0 | PBA20 |
| Z1 | PBA30 |
| Z2 | PBA35 |
| Z3 | #### |
| .... | .... |

FIG. 16

CONTROL METHOD FOR FLASH MEMORY CONTROLLER AND ASSOCIATED FLASH MEMORY CONTROLLER AND STORAGE DEVICE

BACKGROUND OF THE INVENTION

1. Field of the Invention

The present invention relates to a flash memory, and more particularly, to a flash memory controller and an associated control method.

2. Description of the Prior Art

In the Non-Volatile Memory express (NVMe) specification, a zoned namespace is standardized. However, since the above-mentioned zoned namespace and each zone within it are viewed purely from the perspective of a host device, the size of each zone defined by the host device and the size of each block in a flash memory module of a storage device does not have a fixed relationship. Therefore, when the host device prepares to write data corresponding to a zone to the flash memory module, a flash memory controller will need to create a large number of mapping tables between logical addresses and physical addresses, such as a page-based mapping relationship between the logical address and the physical address is recorded, which causes the burden of data processing on the flash memory controller and occupies storage space of the static random access memory (SRAM) and/or storage space of the dynamic random access memory (DRAM).

SUMMARY OF THE INVENTION

One of the objectives of the present invention is to provide a flash memory controller capable of efficiently managing the data that the host device writes into the zoned namespace in the flash memory module, and creating a logical address to physical address mapping table with a smaller size, to solve the aforementioned problem.

At least one embodiment of the present invention provides a control method applied to a flash memory controller. The flash memory controller is configured to access a flash memory module. The flash memory module includes a plurality of blocks, and each block includes a plurality of pages. The control method includes: receiving a settling command from a host device, wherein the settling command configures at least one portion space of the flash memory module as a zoned namespace, wherein the zoned namespace logically comprises a plurality of zones, the host device performs a zone-based data write operation on the zoned namespace, each zone has a same size, a logical address corresponding to each zone has to be continuous, and the logical addresses are not overlapping between zones; using one of a first access mode, a second access mode, a third access mode and a fourth access mode to write data from the host device to the flash memory module, wherein the data is all of the data in a specific zone; if using the first access mode: writing the data to multiple specific blocks of the flash memory module in sequence according to the sequence of the logical address of the data; and after the data being written, writing invalid data to remaining pages of the last specific block of the multiple specific blocks, or keeping the remaining pages blank and do not write data from the host device according to a write command of the host device before erasing; if using the second access mode: writing the data to multiple specific blocks of the flash memory module in sequence according to the sequence of the logical address of the data; and only after the data being written, the remaining pages of the last specific block can be written for data in another zone; if using the third access mode: writing the data to multiple specific blocks of the flash memory module in sequence according to the sequence of the logical address of the data; and after the data being written, writing invalid data to the remaining pages of the specific block, or keeping the remaining pages blank and do not write data from the host device according to the write command of the host device before erasing; if using the fourth access mode: writing the data to multiple specific blocks of the flash memory module in sequence according to the sequence of the logical address of the data; and only after the data being written, the remaining pages of the last specific block can be written for data in another zone.

At least one embodiment of the present invention provides a flash memory controller being configured to access a flash memory module. The flash memory controller includes a read only memory, a microprocessor and a buffer memory. The read only memory is configured to store a code. The microprocessor is configured to execute the code for controlling access of the flash memory module. The microprocessor receives a settling command from a host device, wherein the settling command configures at least one portion space of the flash memory module as a zoned namespace, wherein the zoned namespace logically comprises a plurality of zones, the host device performs a zone-based data write operation on the zoned namespace, each zone has a same size, a logical address corresponding to each zone has to be continuous, and the logical addresses are not overlapping between zones. The microprocessor uses one of a first access mode, a second access mode, a third access mode and a fourth access mode to write data from the host device to the flash memory module, wherein the data is all of the data in a specific zone. When the microprocessor uses the first access mode: writes the data to multiple specific blocks of the flash memory module in sequence according to the sequence of the logical address of the data; and after the data being written, writes invalid data to remaining pages of the last specific block of the multiple specific blocks, or keeping the remaining pages blank and do not write data from the host device according to a write command of the host device before erasing. When the microprocessor uses the second access mode: writes the data to multiple specific blocks of the flash memory module in sequence according to the sequence of the logical address of the data; and only after the data being written, the remaining pages of the last specific block can be written for data in another zone. When the microprocessor uses the third access mode: writes the data to multiple specific blocks of the flash memory module in sequence according to the sequence of the logical address of the data; and after the data being written, writes invalid data to the remaining pages of the specific block, or keeping the remaining pages blank and do not write data from the host device according to the write command of the host device before erasing. When the microprocessor uses the fourth access mode: writes the data to multiple specific blocks of the flash memory module in sequence according to the sequence of the logical address of the data; and only after the data being written, the remaining pages of the last specific block can be written for data in another zone.

At least one embodiment of the present invention provides a storage device including a flash memory module and a flash memory controller. The flash memory module comprises a plurality of blocks, and each block comprises a plurality of pages. The flash memory controller is configured to access the flash memory module. The flash memory controller receives a settling command from a host device, wherein the settling command configures at least one portion space of the flash memory module as a zoned namespace, wherein the zoned namespace logically comprises a plurality of zones, the host device performs a zone-based data write operation on the zoned namespace, each zone has a same size, a logical address corresponding to each zone has to be continuous, and the logical addresses are not overlapping between zones. The flash memory controller uses one of a first access mode, a second access mode, a third access mode and a fourth access mode to write data from the host device to the flash memory module, wherein the data is all of the data in a specific zone. When the flash memory controller uses the first access mode: writes the data to multiple specific blocks of the flash memory module in sequence according to the sequence of the logical address of the data; and after the data being written, writes invalid data to remaining pages of the last specific block of the multiple specific blocks, or keeping the remaining pages blank and do not write data from the host device according to a write command of the host device before erasing. When the flash memory controller uses the second access mode: writes the data to multiple specific blocks of the flash memory module in sequence according to the sequence of the logical address of the data; and only after the data being written, the remaining pages of the last specific block can be written for data in another zone. When the flash memory controller uses the third access mode: writes the data to multiple specific blocks of the flash memory module in sequence according to the sequence of the logical address of the data; and after the data being written, writes invalid data to the remaining pages of the specific block, or keeping the remaining pages blank and do not write data from the host device according to the write command of the host device before erasing. When the flash memory controller uses the fourth access mode: writes the data to multiple specific blocks of the flash memory module in sequence according to the sequence of the logical address of the data; and only after the data being written, the remaining pages of the last specific block can be written for data in another zone.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7A is a diagram illustrating an L2P mapping table according to an embodiment of the present invention.

FIG. 7C is a diagram illustrating an L2P mapping table according to yet another embodiment of the present invention.

FIG. 7D is a diagram illustrating an L2P mapping table according to yet another embodiment of the present invention.

FIG. 11A is a diagram illustrating the L2P mapping table and a shared block table according to an embodiment of the present invention.

FIG. 11B is a diagram illustrating the L2P mapping table and the shared block table according to an embodiment of the present invention.

FIG. 12 is a diagram illustrating a shared block table according to another embodiment of the present invention.

FIG. 16 is a diagram illustrating the L2P mapping table according to an embodiment of the present invention.

DETAILED DESCRIPTION

Figure 1:
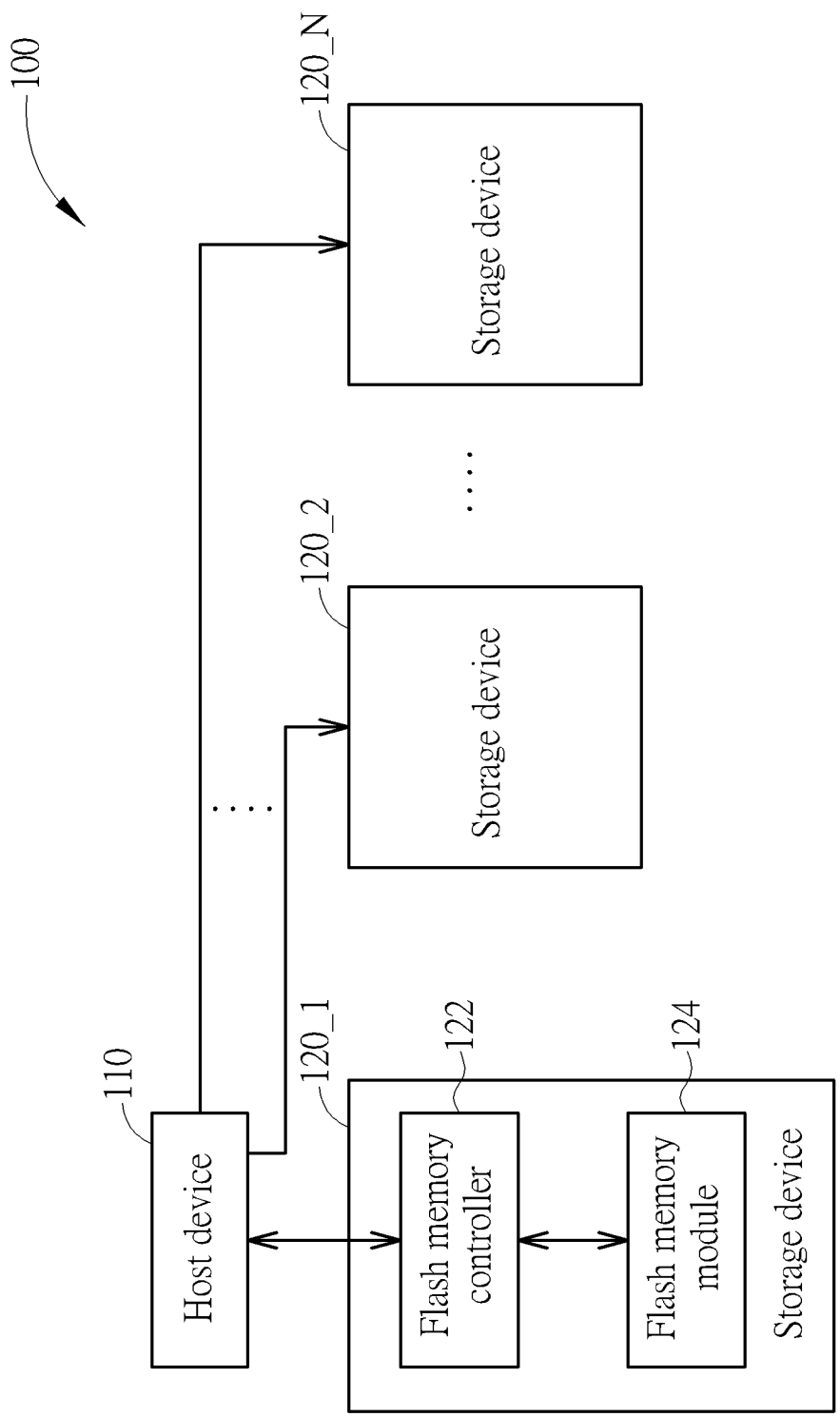
FIG. 1 is a diagram illustrating an electronic device according to an embodiment of the present invention.

FIG. 1 is a diagram illustrating an electronic device 100 according to an embodiment of the present invention. As shown in FIG. 1, the electronic device comprises a host device 110 and a plurality of storage devices 120_1-120_N. Each storage device (e.g., storage device 120_1) includes a flash memory controller 122 and a flash memory module 124. In the present embodiment, each of the plurality of storage devices 120_1-120_N can be a solid-state drive (SSD) or any storage device with a flash memory module. The host device 110 can be a central processing unit or other electronic devices or components that can be used to access the storage devices 120_1-120_N. The electronic device 100 can be a server, a personal computer, a laptop computer or any portable electronic device. It should be noticed that although a plurality of storage devices 120_1-120_N are shown in FIG. 1, in some embodiment, the electronic device 100 may only have a single storage device 120_1.

Figure 2A:
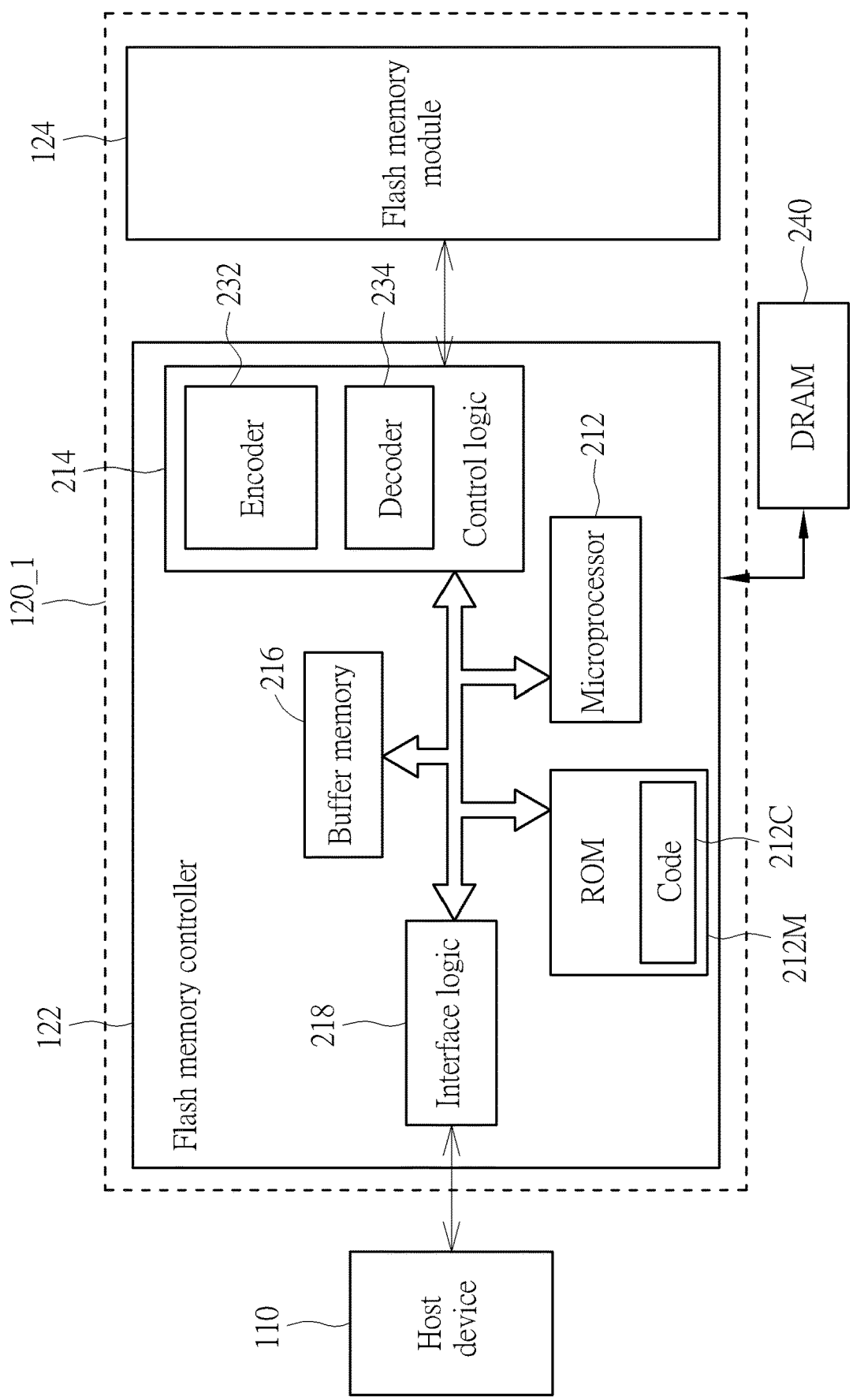
FIG. 2A is a diagram illustrating a flash memory controller in a storage device according to an embodiment of the present invention.

FIG. 2A is a diagram illustrating the storage device 120_1 according to an embodiment of the present invention. As shown in FIG. 2A, the flash memory controller 122 comprises a microprocessor 212, a read only memory (ROM) 212M, a control logic 214, a buffer memory 216 and an interface logic 218. The read only memory 212M is configured to store a code 212C, and the microprocessor 212 is configured to execute the code 212C to control access of the flash memory module 124. The control logic 214 includes an encoder 232 and a decoder 234, wherein the encoder 232 is configured to encode data which is written in the flash memory module 124 to generate a corresponding check code (also known as an error correction code (ECC)), and the decoder 234 is configured to decode data read from the flash memory module 124.

In a general situation, the flash memory module 124 includes a plurality of flash memory chips, and each flash memory chip includes a plurality of blocks. The flash memory controller 122 performs a block-based erase operation upon the flash memory module 124. In addition, a block can record a specific number of pages, wherein the flash memory controller 122 performs a page-based write operation upon the flash memory module 124. In the present embodiment, the flash memory module 124 is a 3D NAND-type flash memory module.

In practice, through the microprocessor 212 executing the code 212C, the flash memory controller 122 may use its own internal components to perform many control operations. For example, the flash memory controller 122 uses the control logic 214 to control access of the flash memory module 124 (especially access of at least one block or at least one page), uses the buffer memory 216 to perform a required buffering operation, and uses the interface logic 218 to communicate with a host device 110. The buffer memory 216 is implemented by a random access memory (RAM). For example, the buffer memory 216 may be a static RAM (SRAM), but the present invention is not limited thereto. In addition, the flash memory controller 122 is coupled to a dynamic random access memory (DRAM) 240. It should be noticed that a DRAM 140 may also be included in the flash memory controller 122. For example, the DRAM 140 and the flash memory controller 122 may coexist in the same package.

In one embodiment, the storage device 120_1 conforms to the NVme specification. That is, the interface logic 218 conforms to a specific communication specification such as a peripheral component interconnect (PCI) specification or a PCI-Express (PCIe) specification, and performs communication according to the specific communication specification. For example, the interface logic 218 communicates with the host device 110 via a connector.

Figure 2B:
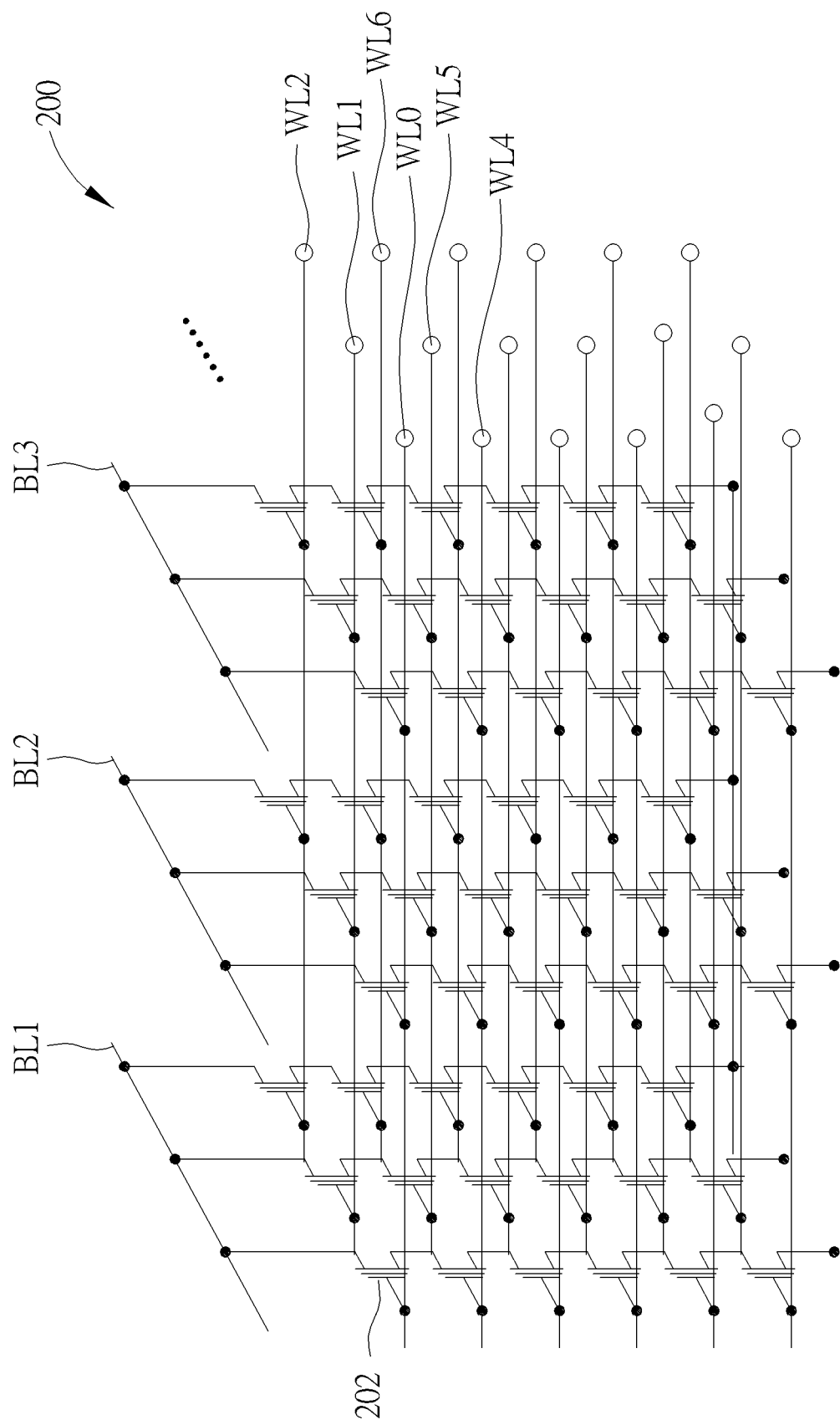
FIG. 2B is a diagram illustrating a block in a flash memory module according to an embodiment of the present invention.

FIG. 2B is a diagram illustrating a block 200 of the flash memory module 124 according to an embodiment of the present invention, wherein the flash memory module 124 is a 3D NAND-type flash memory module. As shown in FIG. 2B, the block 200 includes a plurality of memory cells, such as floating gate transistors 202 shown in FIG. 2 or other charge trapping components. A 3D NAND-type flash memory structure is formed through a plurality of bit lines (only BL1-BL3 are shown in FIG. 2B) and a plurality of word lines (e.g., WL0-WL2 and WL4-WL6 shown in FIG. 2B). Taking a top plane in FIG. 2B as an example, all floating gate transistors on the word line WL0 form at least one page, all floating gate transistors on the word line WL1 form at least another one page, all floating gate transistors on the word line WL2 format least yet another one page, and soon. In addition, the definition between the word line WL0 and the page (logic page) may vary depending on a writing method of the flash memory. In detail, when data are stored using a Single-Level cell (SLC) means, all floating gate transistors on the word line WL0 correspond to only one logic page; when data are stored using a Multi-Level cell (MLC) means, all floating gate transistors on the word line WL0 correspond to two logic pages; when data are stored using a Triple-Level cell (TLC) means, all floating gate transistors on the word line WL0 correspond to three logic pages; and when data are stored using a Quad-Level cell (QLC) means, all floating gate transistors on the word line WL0 correspond to four logic pages. The 3D NAND-type flash memory structure and the relationship between word lines and pages are obvious to those skilled in the art. For simplification, no further illustration is provided.

Figure 3:
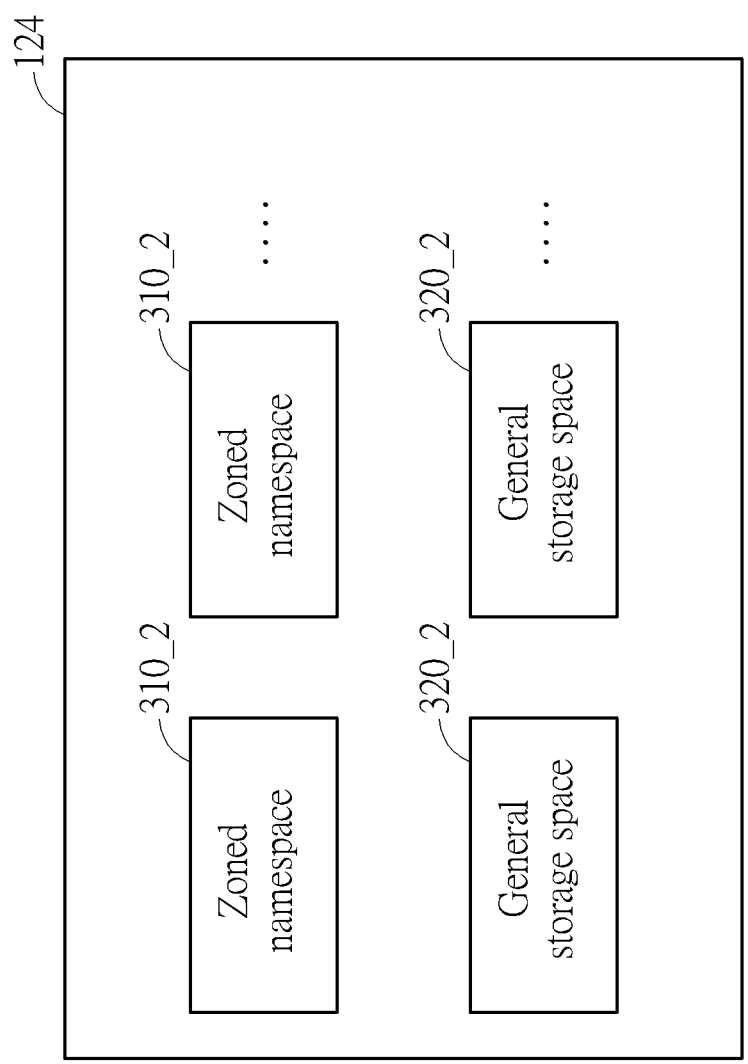
FIG. 3 is a diagram illustrating the flash memory module comprising a general storage space and a zoned namespace.
Figure 4:
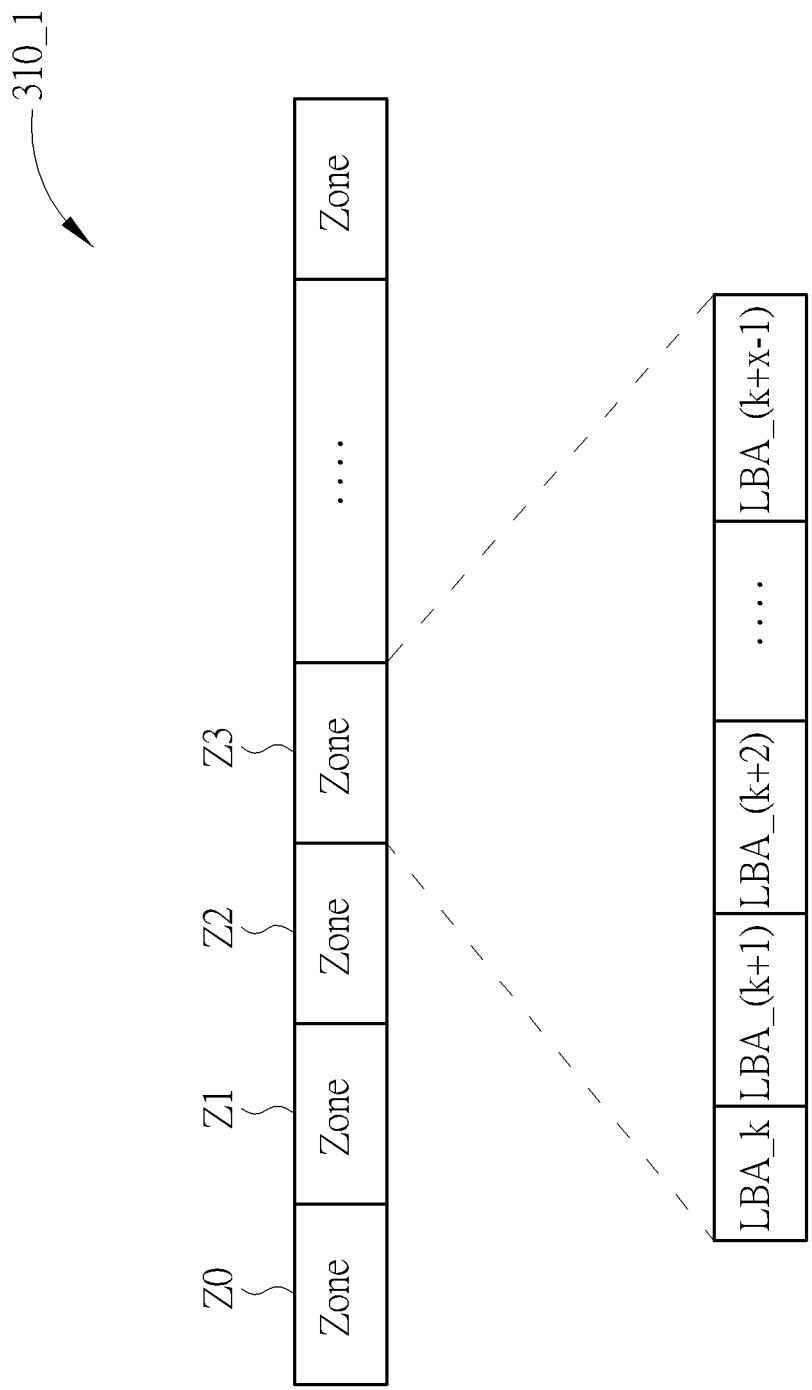
FIG. 4 is a diagram illustrating the zoned namespace divided into multiple zones.

In the present embodiment, the host device 110 can configure at least a part of the flash memory module 124 as a zoned namespace by sending a settling command set, such as a zoned namespace command set. Referring to FIG. 3, the host device 110 can send a settling command set to the flash memory controller 122, such that the flash memory module 124 has at least one zoned namespace (in the present embodiment, taking the zoned namespaces 310_1 and 310_2 as examples) and at least one general storage space (in this embodiment, taking the general storage spaces 320_1 and 320_2 as examples). The zoned namespace 310_1 is divided into multiple zones for access, and the host device 110 must perform a logical block address (LBA)-based data writing operation in the zoned namespace 310_1. A logical block address (or logical address in brief) can represent one 512-byte data, and the host device 110 needs to continuously write data to a zone. Specifically, referring to FIG. 4, the zoned namespace 310_1 is divided into multiple zones (e.g., zones Z0, Z1, Z2, Z3, etc.), where the size of the zone is set by the host device 110, but the size of each zone is the same. The logical addresses within each zone must be continuous, and there will be no overlapping logical addresses between the zones, that is, a logical address can only exist in one zone. For example, if the size of each zone is "x" logical addresses, and the starting logical address of the zone Z3 is LBA_k, then zone Z3 is used to store data with the logical addresses LBA_k, LBA_(k+1), LBA_(k+2), LBA_(k+3), . . . , LBA_(k+x−1). In one embodiment, the logical addresses of adjacent zones are also continuous. For example, the zone Z0 is used to store data with logical addresses LBA_1-LBA_2000, the zone Z1 is used to store data with logical addresses LBA_2001-LBA_4000, the zone Z2 is used to store data with logical addresses LBA_4001-LBA_6000, the zone Z3 is used to store data with logical addresses LBA_6001-LBA_8000, and so on. In addition, the amount of data corresponding to a logical address can be determined by the host device 110. For example, the amount of data corresponding to a logical address can be 4 kilobytes (KB).

In addition, when being written in each zone, the data is written according to the sequence of the logical addresses of the data. In detail, the flash memory controller 122 sets a write point according to the written data to control the writing sequence of the data. In detail, assuming that the zone Z1 is used to store data with logical addresses LBA_2001-LBA_4000, after the host device 110 transmits the data corresponding to the logical addresses LBA_2001-LBA 2051 to the flash memory controller 122, the flash memory controller 122 sets the write point to the next logical address LBA_2052. If the host device 110 subsequently transmits data belonging to the same zone but does not have the logical address LBA_2052, for example, the host device 110 transmits data with the logical address LBA_3000, the flash memory controller 122 rejects the data writing operation and returns the message of writing failure to the host device 110;in other words, only when the logical address of the received data is the same as the logical address pointed to by the write point, the flash memory controller 122 allows the data writing operation. In addition, if data in multiple zones are written alternately, each zone can have its own write point.

According to above arrangement, the host device 110 communicates with the storage device 120_1 to perform a zone-based access on the zoned namespace 310_1. However, since the above-mentioned zoned namespace 310_1 and each zone are from the perspective of the host device 110, the size of each zone defined by the host device 110 does not have an unchanging relationship with the size of each physical block in the flash memory module 124 in the storage device 120_1. Specifically, different flash memory module manufacturers produce different flash memory modules. Different memory modules have physical blocks of different sizes, and a size of one of these physical blocks is not necessarily an integer multiple of a size of another of these physical blocks. For example, the physical block size of the flash memory module of model A may be 1.3 times larger than the physical block size of the flash memory module of model B, and the physical block size of the flash memory module of model C may be 3.7 times larger than the physical block size of the flash memory module of model B. In this way, it is very difficult to align the zone set by the host device 110 with the physical blocks. At this time, the flash memory controller 122 has a great difficulty in mapping the logical blocks to the physical blocks. For example, it may cause a lot of redundant space in the storage device 120_1 that cannot be used by a user, or when the host device 110 prepares to write data corresponding to a zone to the flash memory module 124, the complexity of creating a logical address to physical address (L2P) mapping table via the flash memory controller 122 is increased. In the following embodiments, the present invention provides a method that allows the flash memory controller 122 to efficiently access the zoned namespace 310_1 according to the access command of the host device 110.

Figure 5:
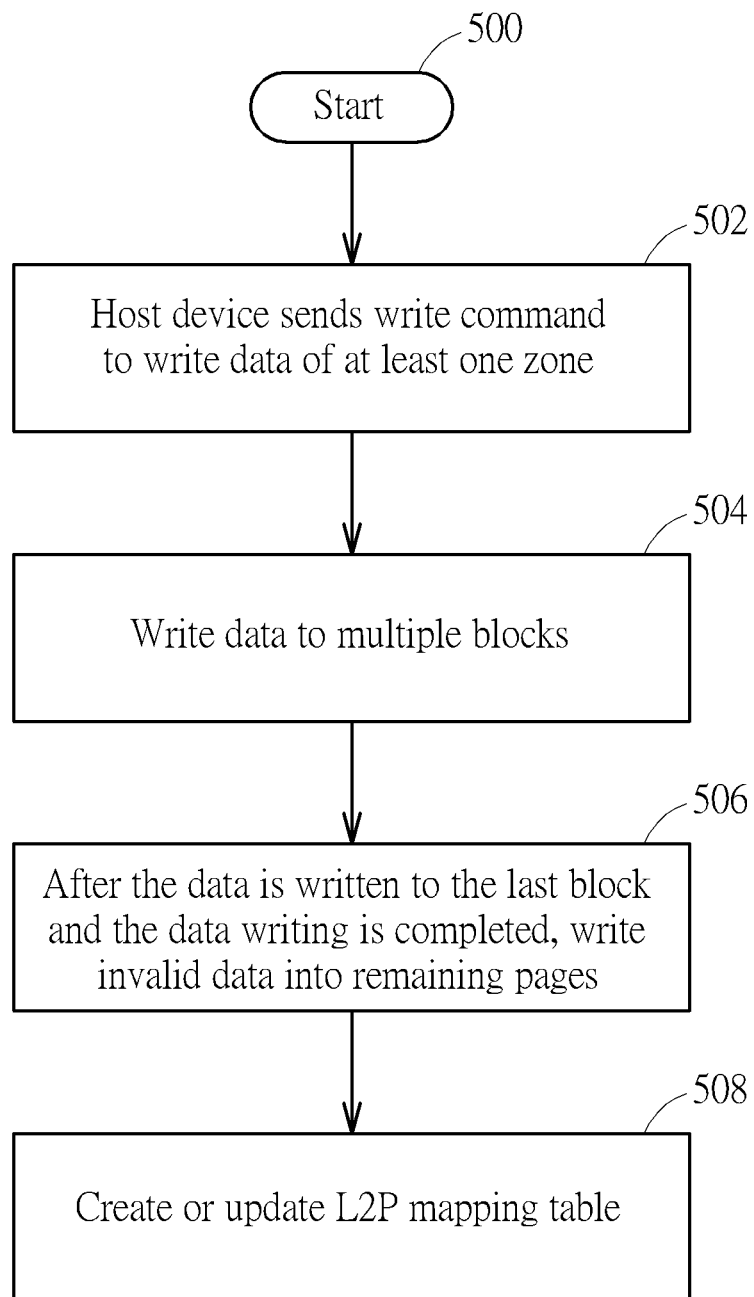
FIG. 5 is a flowchart illustrating writing data from a host device to the zoned namespace according to an embodiment of the present invention.

FIG. 5 is a flowchart illustrating writing data from the host device 110 to the zoned namespace 310_1 according to an embodiment of the present invention. In the present embodiment, it is assumed that the amount of data corresponding to each zone is greater than the size of each physical block in the flash memory module 124, and the amount of data corresponding to each zone is not an integer multiple of the size of each physical block in the flash memory module 124. In step 500, the flow starts, and the host device 110 and the storage device 120_1 are powered on and an initialization operation is completed. The host device 110 sets basic settings for at least a portion of the storage zone of the storage device 120_1 (e.g., a size of each zone, a number of zones and a logical block address size) by using, for example, a zoned namespaces command set. In step 502, the host device 110 sends a write command and corresponding data to the flash memory controller 122, where the above-mentioned data is data corresponding to one or more zones, such as the data corresponding to the logical addresses LBA_k-LBA_(k+x−1) in the zone Z3 in FIG. 4. In step 504, the flash memory controller 122 selects at least one block (e.g., a blank block, also known as a spare block) from the flash memory module 124, and writes data from the host device 110 to the at least one block in sequence. Since the size of the zone set by the host device 110 is very difficult to match the size of the physical block, after the host device 110 sends the write commands to all the logical addresses in the zone Z3, the data to be written by the host device 110 usually cannot fully fill the storage space of the physical block. In other words, the data storage capacity corresponding to a zone is usually not an integer multiple of the size of the zone in a physical block used to store the data written by the host device 110. In step 506, after the data is written to the last block and the data writing is completed, the flash memory controller 122 writes invalid data into remaining pages of the last block, or directly keeps the remaining pages blank. It should be noticed that each block usually reserves several pages to store system management information, including a write time table, a logical physical mapping table, the check bit of error correction code and the redundant array of independent disks (RAID) parity, etc. The remaining pages mentioned above represent the pages remained after the system management information and the data to be stored by the host device 110 are written into the last block.

Figure 6:
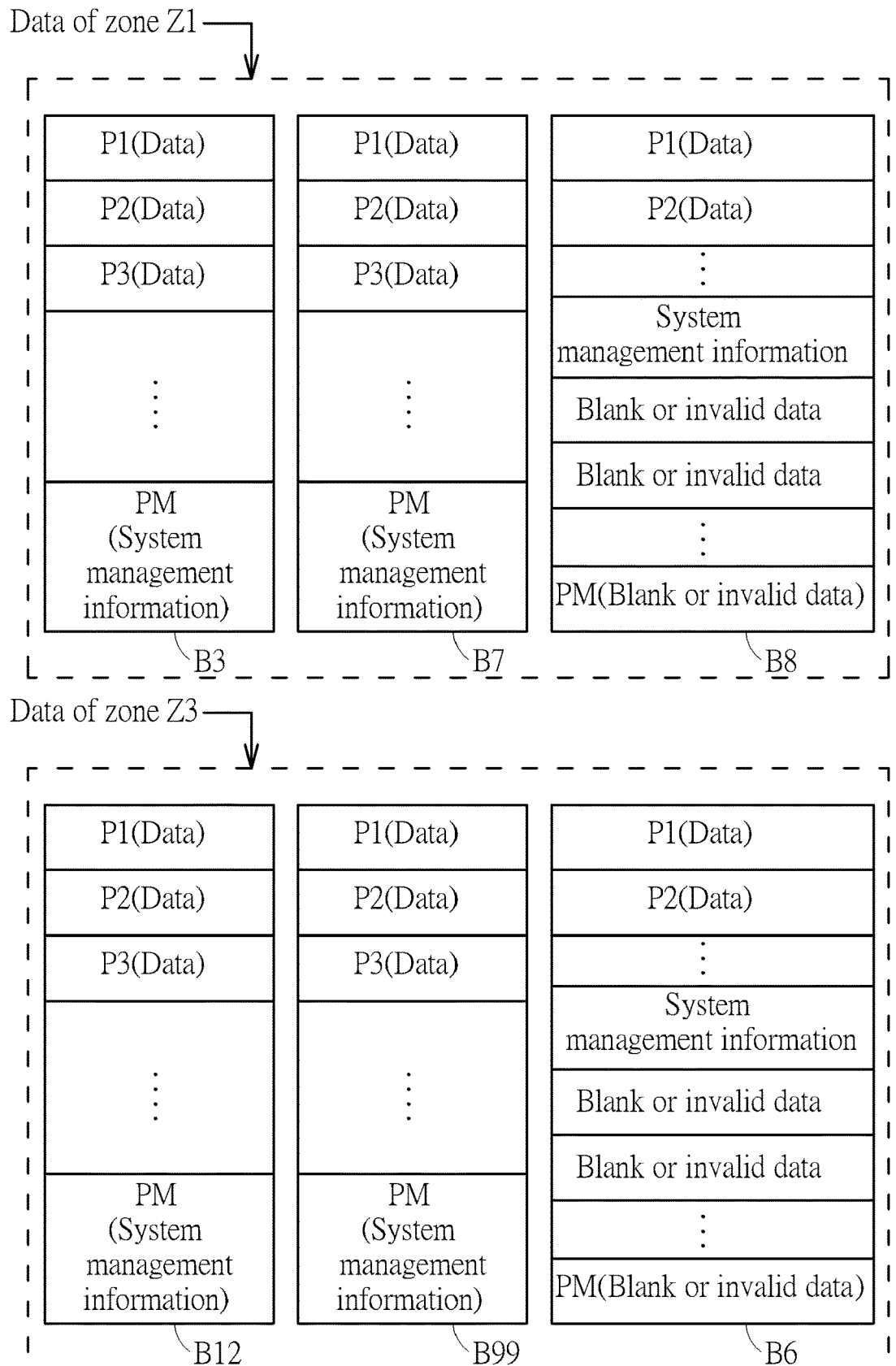
FIG. 6 is a diagram illustrating the zone data written to the blocks in the flash memory module.
Figure 7B:
FIG. 7B is a diagram illustrating an L2P mapping table according to another embodiment of the present invention.

For example, referring to FIG. 6, assuming that the amount of data corresponding to each zone is between two blocks and three blocks in the flash memory module 124, the flash memory control 122 can sequentially write the data of the zone Z1 into the blocks B3, B7 and B8 in response to the write command sent by the host device 110 for the zone Z1. It should be noticed that, in one embodiment, the write command sent by the host device 110 for the zone Z1 comprises the starting logical address of the zone Z1, and the flash memory controller 122 maps the starting logical address of the zone Z1 to the starting physical storage space of the physical block B3, such as the first physical page, and the flash memory controller 122 stores the data corresponding to the starting logical address of the zone Z1 into the initial physical storage space of the physical block B3, such as the first physical page. The blocks B3, B7 and B8 all contain the pages P1-PM, and the data in the zone Z1 is written sequentially from the first page P1 to the last page PM of the block B3 according to the logical addresses. After the data in the block B3 is written, the writing operation continues from the first page P1 to the last page PM of the block B7. It should be noticed that even if the host device 110 continuously performs the writing operation regarding the logical addresses in the zone Z1, the flash memory controller 122 can still select the discontinuous blocks B3 and B7 to store the data which is continuous in logic addresses. After the data is written in the block B7, the data is continuously written to the first page P1 of the block B8 until the end of the data of the zone Z1; in addition, the remaining pages in the block B8 keep blank or have invalid data written therein. Similarly, the flash memory controller 122 can sequentially write the data of the zone Z3 to the blocks B12, B99 and B6, where the blocks B12, B99 and B6 all comprise the pages P1-PM, and the data of the zone Z3 is written sequentially, starting from the first page P1 to the last page PM of the block B12 according to the logical addresses. After the data in block B12 is written, the data is continuously written, starting from the first page P1 to the last page PM of the block B99, and after the data in block B99 is written, the data is continuously written, starting from the first page P1 of the block B6 until the end of the data of the zone Z3. In addition, the remaining pages of the block B6 keep blank or have invalid data written therein. It should be noticed that the flash memory controller 122 may not establish a logical page to physical page mapping relationship for the physical pages with the invalid data stored therein. The flash memory controller 122 usually sets physical blocks having blank physical pages or having physical pages with invalid data to correspond to the last portion of each zone. In other words, the flash memory controller 122 stores the data corresponding to the last logical address of the zone in a physical block with blank pages or invalid data. For example, as shown in FIG. 7B (which will be detailed later), the logical address Z1_LBA+S+2*y corresponds to the physical block address PBA8. If the data of the last logical address of the zone is stored in an $X^{th}$ storage unit (e.g., a physical storage page or a sub-diagram) of a physical block, then the $(X+1)^{th}$ storage unit of the physical block reserves a blank page or has invalid data written therein, that is, a page having a blank page or written with invalid data is connected after the physical storage unit where the data at the last logical address of the corresponding zone is stored. In another embodiment, the host device 110 defines a larger zone size and a smaller zone capacity. For example, the zone size is 512 MB and the zone capacity is 500 MB. In this example, the flash memory controller 122 may not arrange a blank page or a page written with invalid data directly after the physical storage unit where the data at the last logical address of the corresponding zone is stored.

In another embodiment, the host device 110 sends the write commands regarding the continuous logical addresses of the zones Z1 and Z2, and the flash memory controller 122 selects blocks B3, B7, B8, B12, B99 and B6 configured to store data belonging to the zone Z1 and Z2. Since the zone size set by the host device 110 is not the same as the size of the physical block, the data to be written by the host device 110 still cannot fully fill the storage space of the physical block. For example, the storage space used to store host data in the physical block B8 cannot be fully filled. Therefore, the flash memory controller 122 still needs to leave the storage space in the physical block B8 with blank pages or pages with invalid data written therein, so even though the host device 110 sends write commands for data writing of continuous logical addresses in the zones Z1 and Z2 while the physical block B8 still has storage space available to store data, the flash memory controller 122 does not store the data corresponding to the starting logical address of the zone Z2 in the physical block B8. In other words, even if the host device 110 sends write commands for data writing of the continuous logical addresses (for example, a write command comprising the last logical address of the zone Z1 and the first logical address of the zone Z2), and a specific physical block (e.g., the physical block B8) has enough space to store the data with the continuous logical addresses, the flash memory controller 122 still does not continuously store the data corresponding to the continuous logical addresses into the specific physical block. Instead, the flash memory controller 122 jumps to another physical block (e.g., block B2) to write the data corresponding to the first logical address of the zone Z2. Similarly, if the host device 110 sends a read command for data reading of continuous logical addresses in the zones Z1 and Z2 (for example, a read command comprising the last logical address of the zone Z1 and the first logical address of the zone Z2), after the flash memory controller 122 reads the data stored in the last logical address of the corresponding zone Z1 in the physical block P8, it also jumps to the block B20 to read the first storage position of the block B20, to obtain the data of the first logical address of the zone Z2.

In step 508, the flash memory controller 122 creates or updates an L2P mapping table to record the mapping relationship between the logical addresses and the physical addresses for subsequent data reading from the zoned namespace 310_1. FIG. 7A is a diagram illustrating an L2P mapping table 700 according to an embodiment of the present invention. The L2P mapping table 700 includes two fields. One field records the starting logical addresses of the zones, and the other field records the physical block addresses of the blocks. Please refer to FIG. 7A in conjunction with FIG. 6. Since the data of zone Z1 is written to blocks B3, B7 and B8 in sequence and the data of the zone Z3 is written to the blocks B12, B99 and B6 in sequence, the L2P mapping table 700 records the starting logical address Z1_LBA_S of the zone Z1 and the physical block addresses PBA3, PBA7 and PBA8 of the blocks B3, B7 and B8, and the starting logical address Z3_LBA_S of the zone Z3 and the physical block addresses PBA12, PBA99 and PBA6 of the blocks B12, B99 and B6 are recorded. For example, assuming that the zone Z1 is configured to store data with logical addresses LBA_2001-LBA_4000, and the zone Z3 is configured to store data with logical addresses LBA_6001-LBA_8000, the starting logical address Z1_LBA_S of the zone Z1 is also LBA_2001, and the starting logical address Z3_LBA_S of the zone Z3 is also LBA_6001. Please notice that the steps in the flowchart for writing data from the host device 110 to the zoned namespace 310_1 do not have to be performed in a fixed order as long as they can achieve the same purpose. For example, the step 508 can be performed after the step 502. Those skilled in the art can understand it under the teaching of the present invention. It should be noticed that, in the present embodiment, each physical block corresponds to only one zone. For example, the blocks B3, B7 and B8 correspond to only the zone Z1, and the blocks B12, B99 and B6 correspond to only the zone Z3. In other words, a single block stores only data in a single zone. For example, the blocks B3, B7 and B8 store only data corresponding to the zone Z1, and blocks B12, B99 and B6 only store data corresponding to the zone Z3.

In addition, if the host device 110 wants to reset a zone such as the zone Z1, the flash memory controller 122 usually amends the L2P mapping table 700 to delete the field of the physical block addresses corresponding to the zone Z1, such as the physical block addresses PBA3, PBA7 and PBA8 in the L2P mapping table 700. This means that the host no longer needs the data stored in these physical blocks, and the flash memory controller 122 can erase these physical blocks later. Please notice that the physical block B8 stores the data to be stored by the host device 110 and invalid data, although the host device 110 wants to reset the zone Z1 which does not comprise the invalid data. For the convenience of management, the flash memory controller 122 completely deletes the physical block address PBA8 in the L2P mapping table 700 as a whole after receiving the reset command from the host device 110 for the zone Z1, even if the zone Z1 to be reset by the host device 110 does not include the invalid data stored in the physical block B8. Moreover, before the flash memory controller 122 erases the physical block B8, it does not move the invalid data that is not included in the reset command from the host device 110 to other physical blocks, and directly deletes the entire physical block instead.

In the above embodiment, the data stored in any physical block in the zoned namespace 310_1 must belong to the same zone, that is, the logical addresses corresponding to all the data stored in any physical block belong to the same zone, and the host device 110 writes data to continuous logical addresses in one zone. Therefore, the L2P mapping table 700 of this embodiment may comprise only the physical block addresses of the zoned namespace 310_1, and does not comprise any page addresses, that is, the L2P mapping table 700 does not record serial numbers of pages or related page information in any block. In addition, the L2P mapping table 700 also records only the starting logical address of each zone. Therefore, the L2P mapping table 700 has only a small amount of data, such that the L2P mapping table 700 can stay resident in the buffer memory 216 or the DRAM 240 without causing burden on the storage space of the buffer memory 216 or the DRAM 240. Please notice that after the host device 110 sets the zone size and the number of zones, the starting logical address of each zone is determined, such that the L2P mapping table 700 can be further simplified to have one field, that is, only the field of the physical block addresses. The starting logical address fields of zones can be represented by entries of the table, as illustrated by the L2P mapping table 710 shown in FIG. 7B. There is no need to actually store the starting logical addresses of multiple zones.

In the above embodiment, the L2P mapping table 700 may include only the physical block addresses of the zoned namespace 310_1, but not any page address. However, in another embodiment, the L2P mapping table 700 may include the starting logical address of each zone and the corresponding physical block address and the physical page address of the first page. Since one zone in the L2P mapping table comprises only one physical block address and one physical page address, the zone has only a small amount of data.

FIG. 7C is a diagram illustrating an L2P mapping table 720 according to yet another embodiment of the present invention. The L2P mapping table 720 includes two fields. One field records the logical addresses, and the other field records the physical block addresses of the blocks. Please refer to FIG. 7C in conjunction with FIG. 6. Since the data of the zone Z1 is written to the blocks B3, B7 and B8 in sequence and the data of the zone Z3 is written to blocks B12, B99 and B6 in sequence, the L2P mapping table 720 records the starting logical address Z1_LBA_S of the zone Z1 and the physical block address PBA3 of block B3, the logical address (Z1_LBA_S+y) of the zone Z1 and the physical block address PBA7 of the block B7, and the logical address (Z1_LBA_S+2*y) of the zone Z1 and the physical block address PBA8 of the block B8, wherein the logical address (Z1_LBA_S+y) can be the first logical address of the data written to the block B7 (that is, the logical address corresponding to the page P1 of the block B7), and the logical address (Z1_LBA_S+2*y) can be the first logical address of the data written to the block B8 (that is, the logical address corresponding to the page P1 of block B8). Similarly, the L2P mapping table 720 records the starting logical address Z3_LBA_S of the zone Z3 and the physical block address PBA12 of the block B12, and the logical address (Z3_LBA_S+y) of zone Z3 and the physical block address PBA99 of the block B99, and the logical address (Z3_LBA_S+2*y) of the zone Z6 and the physical block address PBA6 of the block B6, wherein the logical address (Z3_LBA_S+y) can be the first logical address of the data written to the block B99 (that is, the logical address corresponding to the page P1 of block B99), and the logical address (Z3_LBA_S+2*y) can be the first logical address of the data written to the block B6 (that is, the logical address corresponding to the page P1 of the block B6). It should be noticed that the above-mentioned "y" can indicate how many pieces of data with different logical addresses that can be stored in a block, especially the data that the host device 110 transmits to the storage device 120_1 and wants the storage device 120_1 to store. Please notice that after the host device 110 sets the zone size and the number of zones, the starting logical address of each zone is determined, and the starting logical address of each sub-zone is also determined, such as Z1_LBA_S, Z1_LBA_S+y, Z1_LBA_S+2*y, Z2_LBA_S, Z2_LBA_S+y, Z2_LBA_S+2*y, etc. Therefore, the L2P mapping table 720 can be further simplified to have one field, that is, only one field of the physical block addresses. The logical address field can be represented by entries of the table, as illustrated by the L2P mapping table 740 in FIG. 7D. There is no need to actually store the starting logical addresses of multiple sub-zones.

It should be noticed that the L2P mapping table 720 of this embodiment includes only the physical block addresses of the zoned namespace 310_1, and does not include any page addresses, that is, the L2P mapping table 720 does not record serial numbers of pages or related page information in any block. In addition, the L2P mapping table 720 records only the first logical address corresponding to each block. Therefore, the L2P mapping table 720 has only a small amount of data, so the L2P mapping table 720 can stay resident in the buffer memory 216 or the DRAM 240 without causing burden on the storage space of the buffer memory 216 or the DRAM 240. In one embodiment, the physical block address recorded in the above-mentioned L2P mapping table 720 can be additionally accompanied by the physical page address of the first page, and adding an additional physical page address will not cause burden on storage space in practice.

Figure 8:
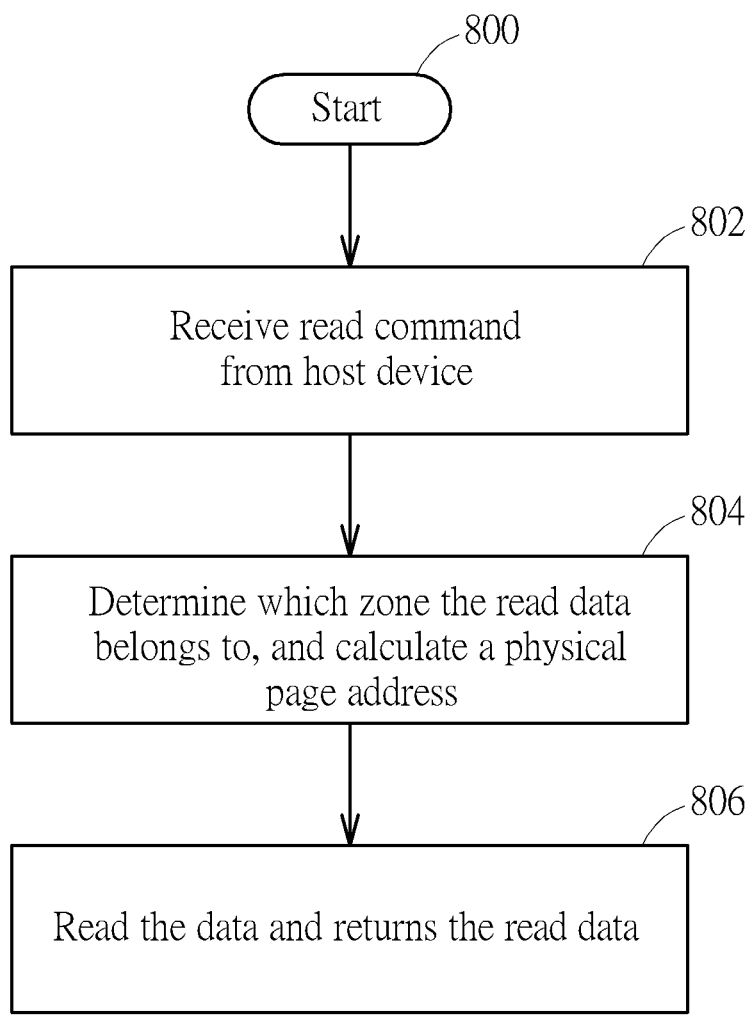
FIG. 8 is a flowchart illustrating reading data from the zoned namespace according to an embodiment of the present invention.

FIG. 8 is a flowchart illustrating reading data from the zoned namespace 310_1 according to an embodiment of the present invention. In this embodiment, it is assumed that the zoned namespace 310_1 has already stored the data of the zones Z1 and Z3 shown in FIG. 6. In step 800, the flow starts, the host device 110 and the storage device 120_1 are powered on and the initialization operation (for example, the boot procedure) is completed. In step 802, the host device 110 sends a read command to request reading of data with a specific logical address. In step 804, the microprocessor 212 of the flash memory controller 122 determines which zone the specific logical address belongs to, and calculates a physical page address corresponding to the specific logical address according to the logical address recorded in the L2P mapping table 700 or the L2P mapping table 720. Take the L2P mapping table 700 in FIG. 7A as an example for illustration. Since the L2P mapping table 700 records the starting logical address of each zone and the number of logical addresses of each zone is already known, the microprocessor 212 can know which zone the specific logical address belongs to from the above information. Take the embodiment shown in FIGS. 6 and 7A as examples for illustration. Assuming that the specific logical address is an address LBA 2500, a zone comprises 2000 logical addresses, and the L2P mapping table 700 records the starting logical address Z1_LBA_S of the zone Z1 as an address LBA_2001, the microprocessor 212 can determine that the specific logical address belongs to the zone Z1. Then, the microprocessor 212 determines the difference between the specific logical address and the starting logical address Z1_LBA_S of the zone Z1, and then refers to how many pieces of data with different logical addresses that can be stored in each page of the block, to determine the physical page address corresponding to the specific logical address. For the convenience of illustration, it is assumed that each page in the block can only store data of one logical address, and the difference between the specific logical address and the starting logical address Z1_LBA_S of the zone Z1 is 500 logical addresses. Then, the microprocessor 212 can calculate that the specific logical address corresponds to the physical page address of the 500$^{th}$ page P500 in the block B3. If the number of pages in the block B3 is less than 500, then the 500 pages will be counted from the first page P1 of the block B3 to obtain the physical page address in the block B7.

On the other hand, taking the L2P mapping table 720 in FIG. 7C as an example for illustration, the L2P mapping table 720 records multiple logical addresses of a zone, and these logical addresses respectively correspond to the first pages P1 of the blocks B3, B7 and B8. Therefore, the microprocessor 212 can know which zone and which block the specific logical address belongs to from the above information. Then, the microprocessor 212 refers to the difference between the specific logical address and the logical address (e.g., Z1_LBA_S, (Z1_LBA_S+y) or (Z1_LBA_S+2y)) of the zone Z1, and then refers to how many pieces of data with different logical addresses that can be stored in each page of the block to determine the physical page address corresponding to the specific logical address. For the convenience of explanation, it is assumed that each page in the block can store data of only one logical address, and the difference between the specific logical address and the starting logical address Z1_LBA_S of the zone Z1 is 500 logical addresses. The microprocessor 212 can calculate that the specific logical address corresponds to the physical page address of the 500$^{th}$ page P500 of the block B3.

In step 806, the microprocessor 212 reads the corresponding data from the zoned namespace 310_1 according to the physical block address and the physical page address determined in step 804, and then returns the read data to the host device 110.

As described above, through the content described in the above embodiments, the flash memory controller 122 can create a small-sized L2P mapping table 700/710/720/730 and can still effectively complete the writing and reading of data in the zoned namespace 310_1. However, in this embodiment, there will be many remaining pages in physical blocks that are wasted, such as blank pages or invalid pages in the physical block B8 and the physical block B6. The remaining pages will greatly reduce the memory space available to the user. Although this method can reduce the management burden of the flash memory controller 122, it will reduce the memory space available to the user. In some extreme cases where the percentage of remaining pages in blocks is too high, the flash memory controller 122 may not be able to arrange enough memory space for the user to use.

Figure 9:
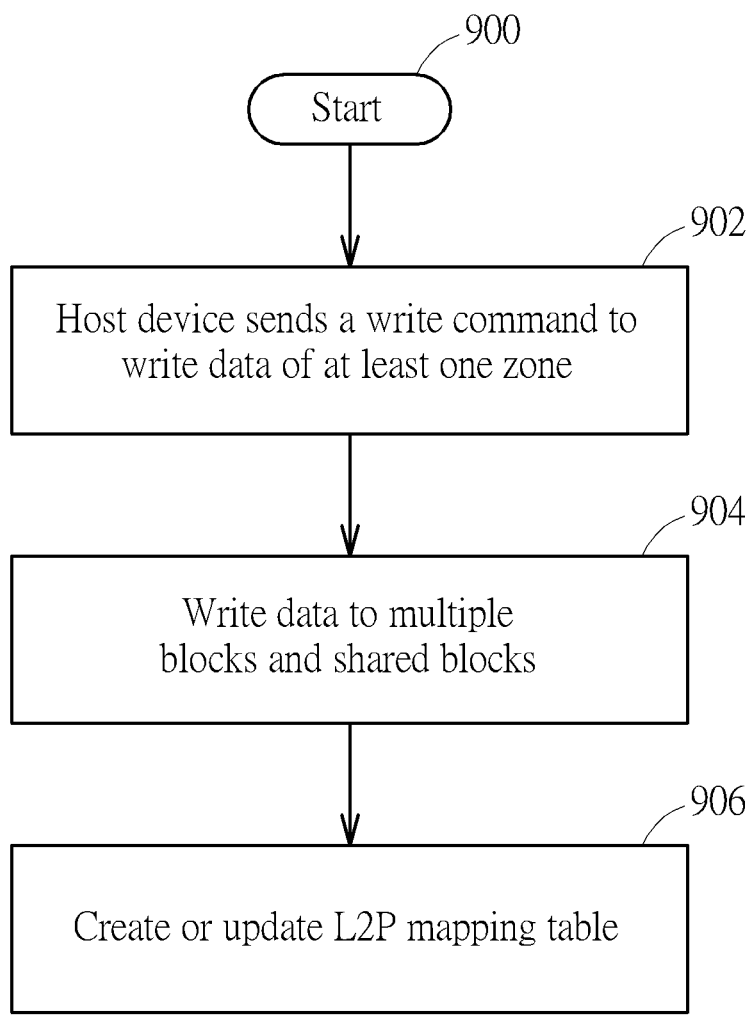
FIG. 9 is a flowchart illustrating writing data from the host device to the zoned namespace according to an embodiment of the present invention.
Figure 10:
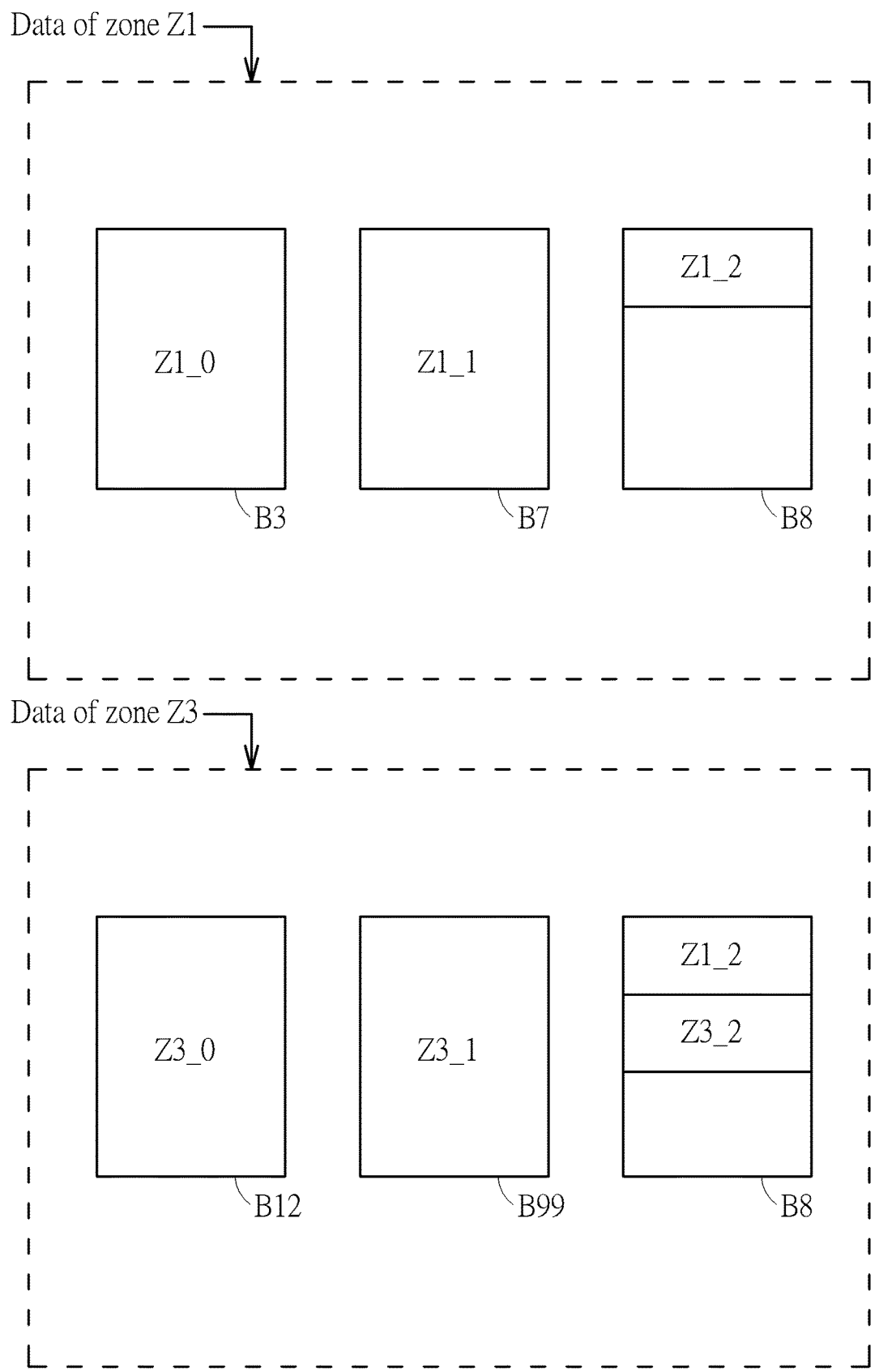
FIG. 10 is a diagram illustrating writing data of the zone to the block in the flash memory module.

FIG. 9 is a flowchart illustrating writing data from the host device 110 to the zoned namespace 310_1 according to another embodiment of the present invention. In the present embodiment, it is assumed that the amount of data corresponding to each zone is greater than the size of each block in the flash memory module 124, and the amount of data corresponding to each zone is not an integer multiple of the size of each block in the flash memory module 124. In step 900, the flow starts. The host device 110 and the storage device 120_1 are powered on and the initialization operation is completed. The host device 110 sets the storage device 120_1 with basic settings (e.g., the size of each zone, the number of zones and the size of the logical block address) by using, for example, the zoned namespaces command set. In step 902, the host device 110 sends a write command and corresponding data to the flash memory controller 122, where the above-mentioned data is data corresponding to one or more zones, such as the data corresponding to the logical addresses LBA_k-LBA_(k+x−1) of the zone Z3 in FIG. 4. In step 904, the flash memory controller 122 selects at least one block (e.g., a blank block, also known as a spare block) from the flash memory module 124, or selects at least one blank block or at least one shared block, to write data from the host device 110 into these blocks in sequence. For example, referring to FIG. 10, assuming that the amount of data corresponding to each zone is between 2-3 blocks in the flash memory module 124, the flash memory controller 122 can write the data of the zone Z1 into the blocks B3, B7 and B8 in sequence, where the block B3 records the first partial data Z1_0 of the zone Z1, and the block B7 records the second partial data Z1_1 of the zone Z1, and the block B8 records the third partial data Z1_2 of the zone Z1. In this embodiment, since all data stored in the blocks B3 and B7 are data in the zone Z1 and only part of the pages in the block B8 store data in the zone Z1, in order to take advantage of the remaining pages in the block B8, the microprocessor 212 sets the block B8 as a shared block, that is, the remaining pages of the block B8 can be used to store data in other zones. Referring to FIG. 10, the flash memory controller 122 is preparing to write the data of the zone Z3 into the zoned namespace 310_1, and since there is a remaining space in the shared block B8, the microprocessor 212 selects two blank blocks B12, B99 and the share block B8 to store data in the zone Z3. Specifically, the flash memory controller 122 sequentially writes the data of the zone Z3 into the blocks B12, B99 and B8. The block B12 records the first partial data Z3_0 of the zone Z3, the block B99 records the second partial data Z3_1 of the zone Z3, and the block B8 records the third partial data Z3_2 of the zone Z3. In this embodiment, all data stored in the blocks B12 and B99 are data of the zone Z3, and the block B8 records both of the third partial data Z1_2 of the zone Z1 and the third partial data Z3_2 of the zone Z3. Please notice that, for the convenience of management, the flash memory controller 122 does not store the first data of any zone in the shared block because this will increase the complexity of creating the L2P mapping table via the flash memory controller 122. The flash memory controller 122 stores the first data of each zone in an exclusive block, such as the blocks B3 and B12. These exclusive blocks only store data belonging to the same zone, so they are called exclusive blocks. The last data of any zone (which corresponds to the data of the last logical address of the zone) will be stored in a shared block, such as block B8, and the last data of another zone will also be stored in the shared block. In this embodiment, the shared block stores data of more than one zone. To put it another way, the shared block stores the last data of more than one zone, and the exclusive block only stores data in a single zone.

In step 906, the flash memory controller 122 creates or updates an L2P mapping table to record the mapping relationship between the logical addresses and the physical addresses, and creates a shared block table for subsequent data reading from the zoned namespace 310_1. FIG. 11A is a diagram illustrating the L2P mapping table 1100A and a shared block table 1130A according to an embodiment of the present invention. The L2P mapping table 1100A comprises two fields. One field records the logical addresses, and the other field records the physical block addresses of the blocks. Please refer to FIG. 11A in conjunction with FIG. 10. Since the data of the zone Z1 is written to the blocks B3, B7 and B8 in sequence, and the data of the zone Z3 is written to the blocks B12, B99 and B8 in sequence, the L2P mapping table 1100A records the starting logical address Z1_LBA_S of the zone Z1 and the physical block address PBA3 of the block B3, and the logical address (Z1_LBA_S+y) of the zone Z1 and the physical block address PBA7 of the block B7, and the logical address (Z1_LBA_S+2*y) of the zone Z1 and the physical block address PBA8 of the block B8. The logical address (Z1_LBA_S+y) can be the first logical address of the data written to the block B7 (that is, the first logical address of the second partial data Z1_1, which also corresponds to the logical address of the first page P1 of the block B7), and the logical address (Z1_LBA_S+2*y) can be the first logical address of the data written to the block B8 (that is, the first logical address of the third partial data Z1_2); similarly, the L2P mapping table 1100A records the starting logical address Z3_LBA_S of the zone Z3 and the physical block address PBA12 of the block B12, the logical address (Z3_LBA_S+y) of the zone Z3 and the physical block address PBA99 of the block B99, and the logical address (Z3_LBA_S+2*y) of the zone Z6 and the physical block address PBA6 of the block B6, wherein the logical address (Z3_LBA_S+y) can be the first logical address of the data written to the block B99 (that is, the first logical address of the second partial data Z3_1, which also corresponds to the logical address of the first page P1 of the block B99), and the logical address (Z3_LBA_S+2*y) can be the first logical address of the data written to the block B8 (that is, the first logical address of the third partial data Z3_2). It should be noticed that the above "y" can represent how many pieces of data with different logical addresses from the host device that can be stored in a block. Please notice that after the host device 110 sets the zone size and the number of zones, the starting logical address of each zone is determined, and the starting logical address of each sub-zone is also determined, such as Z1_LBA_S, Z1_LBA_S+y, Z1_LBA_S+2*y, Z2_LBA_S, Z2_LBA_S+y, Z2_LBA_S+2*y, etc. Therefore, the L2P mapping table 1100A can be further simplified to have one field, that is, only one field of the physical block addresses, and the logical address field can be represented by entries of the table. There is no need to actually store the starting logical addresses of multiple sub-zones. Please refer to the L2P mapping table 1100B in FIG. 11B. Each logical address of the L2P mapping table 1100B has a fixed field, which is sorted according to the lowest to highest (or highest to lowest) logical address. For example, an address Z0_LBA_S represents the starting logical address of the zone 0, which is the lowest logical address in the system, and an address Z0_LBA_S+y represents the starting logical address of the second sub-zone of zone 0, where "y" represents the number of addresses used to store host data in each physical block, an address Z0_LBA_S+2*y represents the starting logical address of the third sub-zone of zone 0. Since the zone size is determined, the value of "y" is also determined. The values in the logical address field in FIG. 11B are quite predictable. Therefore, this logical address field can also be omitted and represented by only entries in the L2P mapping table 1100B.

In addition, the shared block table 1130A comprises two fields. One field records the logical addresses, and the other field records the physical block addresses corresponding to the logical addresses and the physical page addresses. In FIG. 11A, the shared block table 1130A records the first logical address (Z1_LBA_S+2*y) of the third partial data Z1_2 of the zone Z1 and the corresponding physical block address PBA8 and the physical page address P1, that is, the data corresponding to the first logical address in the third partial data Z1_2 is written in the first page P1 of block B8. The shared block table 1130A records the first logical address (Z3_LBA_S+2*y) of the third partial data Z3_2 of the zone Z3 and the corresponding physical block address PBA8 and the physical page address P120. In other words, the data corresponding to the first logical address in the third partial data Z3_2 is written in the $120^{th}$ page P120 of the block B8. Please notice that, it is assumed that each page in the block can store data of only one logical address. The actual situation can be adjusted, depending upon how many pieces of data with different logical addresses that can be stored in one page. Like the L2P mapping table 1100B in FIG. 11B, the shared block table 1130A in FIG. 11A can also be presented in the form of the shared block table 1130B in FIG. 11B. Since the reason is the same, further description is omitted here for simplicity.

In addition, it should be noticed that in the process of writing the data of the zones Z1 and Z3, the writing process may not start to write the data of the zone Z3 to the zone namespace 310_1 after all data in the zone Z1 has been written to the zone namespace 310_1. In other words, it is possible that when the data in the zone Z1 has not been written completely, the flash memory controller 122 needs to start writing the data in the zone Z3 to the zone namespace 310_1. Therefore, in another embodiment of the present invention, the shared block table 1130 may additionally include a completion indicator field, which is used to indicate whether the data of the zone has been completely written in the shared block. Referring to FIG. 12, the shared block table 1230 shown in FIG. 12 is a continuation of the embodiment of FIG. 10. In sub-diagram (a) of FIG. 12, after the third partial data Z1_2 of the zone Z1 is all written into the shared block B8, the microprocessor 212 changes a completion indicator "0" to "1". When the microprocessor 212 needs to write the third partial data Z3_2 of the zone Z3 into the zoned namespace 310_1, since the completion indicator of the third partial data Z1_2 of the zone Z1 corresponding to the shared block B8 is "1", the microprocessor 212 can determine that the shared block B8 is currently available for data writing, write the third partial data Z3_2 of the zone Z3 into the common block B8, and record the physical block address and the physical page address corresponding to the third partial data Z3_2 in the shared block table 1230. On the other hand, in sub-diagram (b) of FIG. 12, when the third partial data Z1_2 of the zone Z1 is being written into the shared block B8, the corresponding completion indicator is "0" (which means that the third partial data Z1_2 of the zone Z1 has not yet been fully written to the shared block B8). If the microprocessor 212 needs to write the third partial data Z3_2 of the zone Z3 into the zone namespace 310_1 at this time, since the completion indicator of the third partial data Z1_2 of the zone Z1 corresponding to the shared block B8 is "0", the microprocessor 212 can determine that the shared block B8 cannot be written by the third partial data Z3_2 at present, so the microprocessor 212 additionally selects a blank block (for example, the block B15), writes the third partial data Z3_2 of the zone Z3 into the block B15, and records the third partial data Z3_2 and the corresponding physical block address PBA15 and the physical page address P1 in the shared block table 1230. Please notice that the shared block table 1230 in FIG. 12 can also be presented in a form similar to that of the shared block table 1130B in FIG. 11B, and has an additional completion indicator field. Since the reason of replacing the logical address field with fixed logical address positions is also the same as that of the L2P mapping table 1100B and the shared block table 1130B, further description is omitted here for simplicity.

In one embodiment, if the host device 110 wants to reset a zone, such as the zone Z1, the flash memory controller 122 usually amends the L2P mapping table 1100A/1100B to delete the field values recording physical block addresses corresponding to the zone Z1. For example, the physical block addresses PBA3, PBA7, and PBA8 in the L2P mapping table 1100A/1100B are deleted, which means that the host no longer needs the data stored in these physical blocks. The flash memory controller 122 can erase these physical blocks later. Please notice that the physical block B8 stores the data to be stored by the host device 110 and the data in the zone Z3. Although the zone Z1 to be reset by the host device 110 does not include the data of the zone Z3, for the convenience of management, the flash memory controller 122 still needs to modify the physical block addresses and the physical page address in the shared block table 1130A/1130B/1230 after receiving the reset command regarding the zone Z1 from the host device 110, to delete PBA8 and P1, for example, by rewriting them to FFFF. Please notice that the completion indicator in the shared block table 1230 is still kept at "1", because the third part of zone Z1 still occupies part of the space in the physical block B8. Before the physical block B8 is erased, the spaces can no longer be written. In addition, before the flash memory controller 122 erases the physical block B8, it is not necessary to move the valid data (e.g., the data in the zone Z3) that is not included in the reset command from the host device 110 to other physical blocks.

In the above embodiment, since a shared block is used to store data corresponding to different zones, it can be considered that data with logical addresses belonging to different zones can be stored in the same physical block. Therefore, the space of the physical block can be effectively used to prevent space waste (e.g., the waste of pages remaining in the physical block without storing data) that occurs when the logical addresses corresponding to a zone have been completely written under a condition that a mismatch exists between the size of the zone and the size of the physical block.

It should be noted that the L2P mapping table 1100A/1100B of this embodiment only comprises the physical block addresses of the zoned namespace 310_1, and does not comprise any page addresses. In other words, the L2P mapping table 1100A/1100B does not record the page serial numbers or related page information in any block. In addition, the shared block table 1130A/1130B/1230 only records a small number of logical addresses. Because the logical addresses of the shared block table 1130A/1130B/1230 are extremely regular, the logical address field can be omitted, and the logical address field can be represented by entries of the table. Therefore, the L2P mapping table 1100A/1100B and the shared block table 1130A/1130B/1230 have only a small amount of data, such that the L2P mapping table 1100A/1100B and the shared block table 1130A/1130B/1230 can stay resident in the buffer memory 216 or the DRAM 240 without causing burden on the storage space of the buffer memory 216 or DRAM 240.

In addition, since physical block addresses recorded in the L2P mapping table 1100A/1100B for logical addresses (Z1_LBA_S+2*y), (Z3_LBA_S+2*y), etc. of last parts of zones are not accurate physical addresses, the microprocessor 212 needs to find the correct physical page addresses by looking up the shared block table 1130A/1130B/1230. Therefore, the physical block addresses (e.g., PBA8) recorded in the L2P mapping table 1100A/1100B for logical addresses (Z1_LBA_S+2*y), (Z3_LBA_S+2*y), etc. of last parts of zones may be directly changed to corresponding entry addresses in the shared block table 1130A/1130B/1230, thus allowing the microprocessor 212 to directly access the entry addresses in the shared block table 1130A/1130B/1230. For example, PBA8 corresponding to the (Z1_LBA_S+2*y) field of the L2P mapping table 1100A/1100B can be directly changed to the memory address corresponding to the (Z1_LBA_S+2*y) field of the shared block table 1130A/1130B, and the PBA8 corresponding to the (Z3_LBA_S+2*y) field of the L2P mapping table 1100A/1100B can be directly changed to the memory address corresponding to the (Z3_LBA_S+2*y) field of the shared block table 1130A/1130B (for example, address in DRAM or SRAM), to speed up the search speed.

Figure 13:
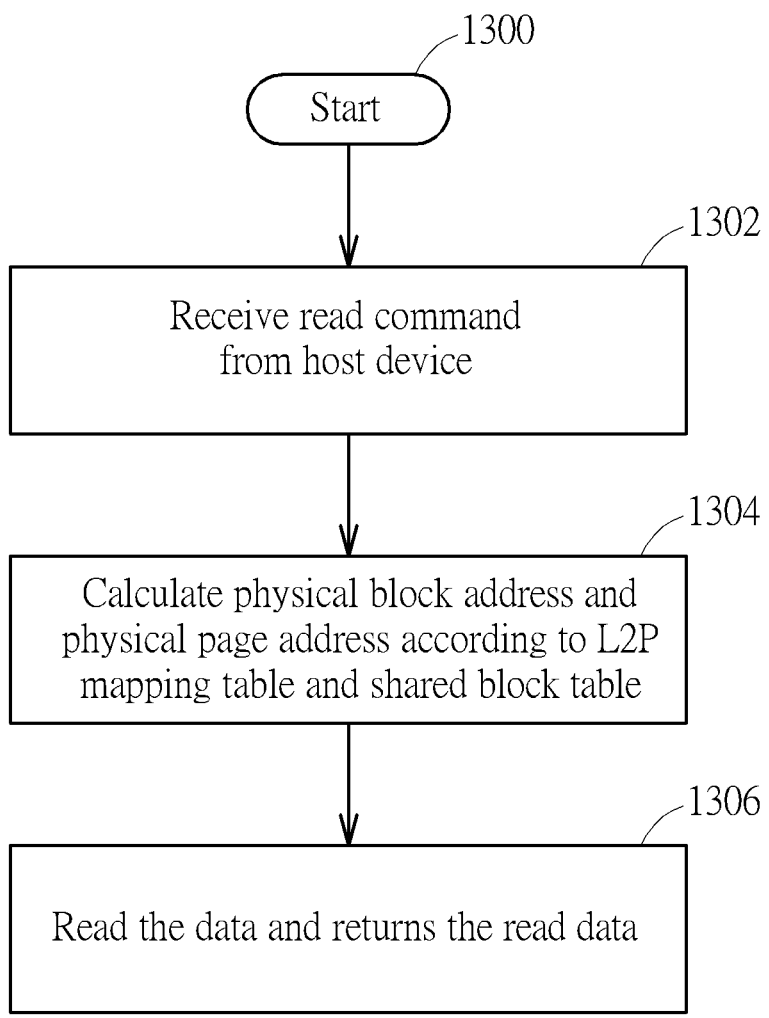
FIG. 13 is a flowchart illustrating reading data from the zoned namespace according to an embodiment of the present invention.

FIG. 13 is a flowchart illustrating reading data from the zoned namespace 310_1 according to an embodiment of the present invention. In the present embodiment, it is assumed that the zone namespace 310_1 has already stored the data of the zones Z1 and Z3 shown in FIG. 10. In step 1300, the flow starts, and the host device 110 and the storage device 120_1 are powered on and the initialization operation (for example, the boot procedure) is completed. In step 1302, the host device 110 sends a read command to request reading data with a specific logical address. In step 1304, the microprocessor 212 in the flash memory controller 122 determines which zone the specific logical address belongs to, and calculates a physical page address corresponding to the specific logical address according to the logical address recorded in the L2P mapping table 1100A/1100B and/or the shared block table 1130A/1130B/1230. Take the L2P mapping table 1100A in FIG. 11A as an example for illustration. The L2P mapping table 1100A records multiple logical addresses of multiple zones, these logical addresses correspond to the pages of the blocks B3, B7 and B8, and the number of logical addresses that can be stored in each block is already known. Therefore, the microprocessor 212 can know which zone and which block the specific logical address belongs to from the above information. Then, assuming that the specific logical address belongs to the zone Z1, the microprocessor 212 refers to the difference between the specific logical address and the logical address of the zone Z1 (for example, Z1_LBA_S, (Z1_LBA_S+y), or (Z1_LBA_S+2y)), and further refers to how many pieces of data with different logical addresses that can be stored in each page of the block, to determine the physical page address corresponding to the specific logical address. For the convenience of explanation, it is assumed that each page in the block can only store data of one logical address, the difference between the specific logical address and the starting logical address Z1_LBA_S of zone Z1 is 500 logical addresses, and the specific logical address is between Z1_LBA_S and (Z1_LBA_S+y) (where y represents the number of addresses used to store host data in each physical block, and in the present embodiment y>500). The microprocessor 212 can calculate the physical page address of the 500$^{th}$ page P500 of the block B3 corresponding to the specific logical address. In the present embodiment, the microprocessor 212 divides the difference 500 by "y" to obtain a quotient of 0 and a remainder of 500. Then, the microprocessor 212 can know that the physical block address corresponding to the specific logical address should be the first entry in the L2P mapping table 1100A. After looking up, the microprocessor 212 finds that the physical block address corresponding to the specific logical address is the physical block address PBA3. Since the remainder is 500, the microprocessor 212 can know that the physical page address corresponding to the specific logical address is P500. Please notice that, besides the physical pages, smaller read units, such as sectors or 4 Kbytes and other addressing units that comply with the NVMe specification may be used for addressing.

On the other hand, assuming that the specific logical address belongs to zone Z3, the microprocessor 212 determines the physical page address corresponding to the specific logical address, by referring to the difference between the specific logical address and the logical address of zone Z3 (for example, Z3_LBA_S, (Z3_LBA_S+y) or (Z3_LBA_S+2y)), and further referring to how many pieces of data with different logical addresses that can be stored in each page of the block. For the convenience of illustration, assuming that each page in the block can only store data of one logical address, the specific logical address is greater than (Z3_LBA_S+2y) and less than or equal to the greatest logical address of the zone Z3, and the difference between the specific logical address and the logical address (Z3_LBA_S+2y) of zone Z3 is 80 logical addresses, the microprocessor 212 can refer to the physical page address P120 corresponding to the third partial data Z3_2 of the zone Z3 recorded in the shared block table 1130, to calculate that the specific logical address corresponds to the physical page address of the 200$^{th}$ page P200 in the shared block B8.

In step 1306, the microprocessor 212 reads the corresponding data from the zoned namespace 310_1 according to the physical block address and physical page address determined in step 1304, and returns the read data to the host device 110.

As described above, through the content described in the above embodiments, the flash memory controller 122 can create a small size L2P mapping table 1100A/1100B and the shared block table 1130A/1130B/1230. The writing and reading of data in the zoned namespace 310_1 can be completed effectively.

In the above embodiments in FIGS. 5-13, it is assumed that the amount of data corresponding to each zone is greater than the size of each block in the flash memory module 124. However, the host device 110 can also set the amount of data corresponding to each zone to be lower than the size of each block in the flash memory module 124, and the related access methods are as follows.

Figure 14:
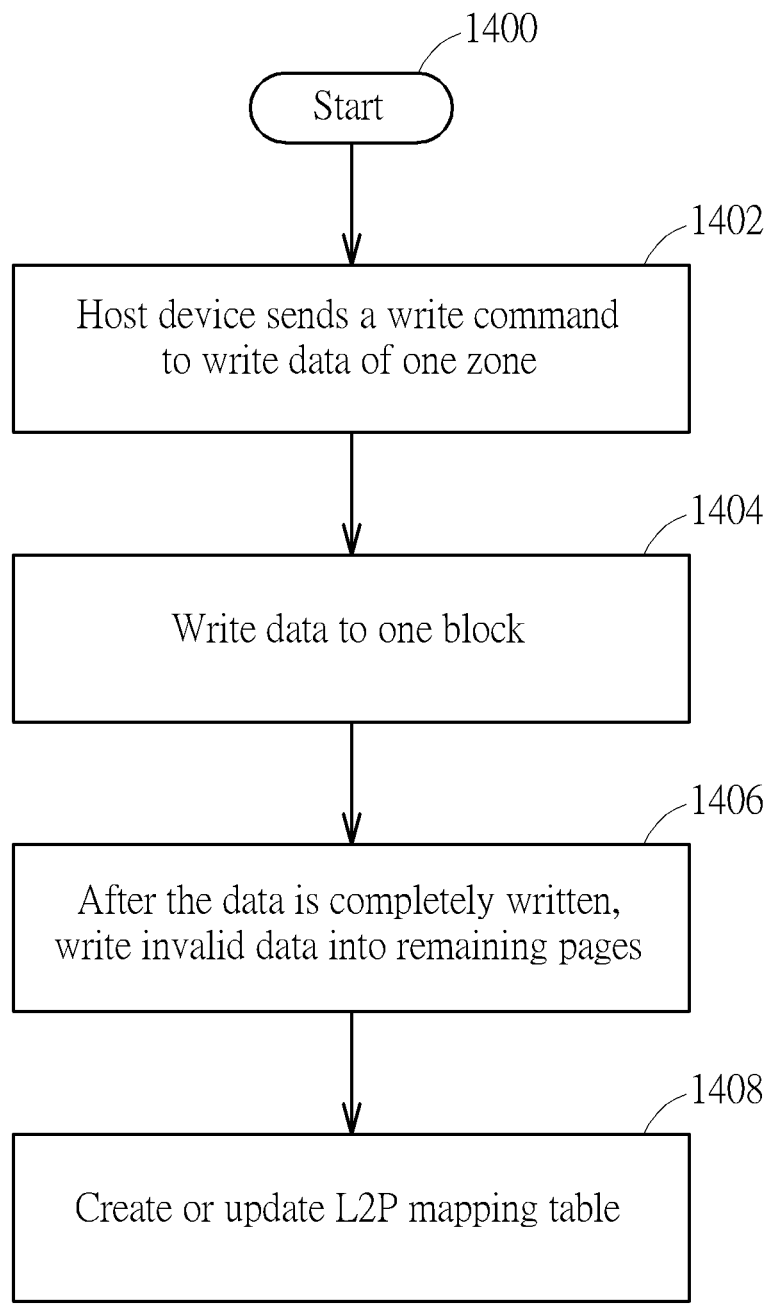
FIG. 14 is a flowchart illustrating writing data from the host device to the zoned namespace according to an embodiment of the present invention.
Figure 15:
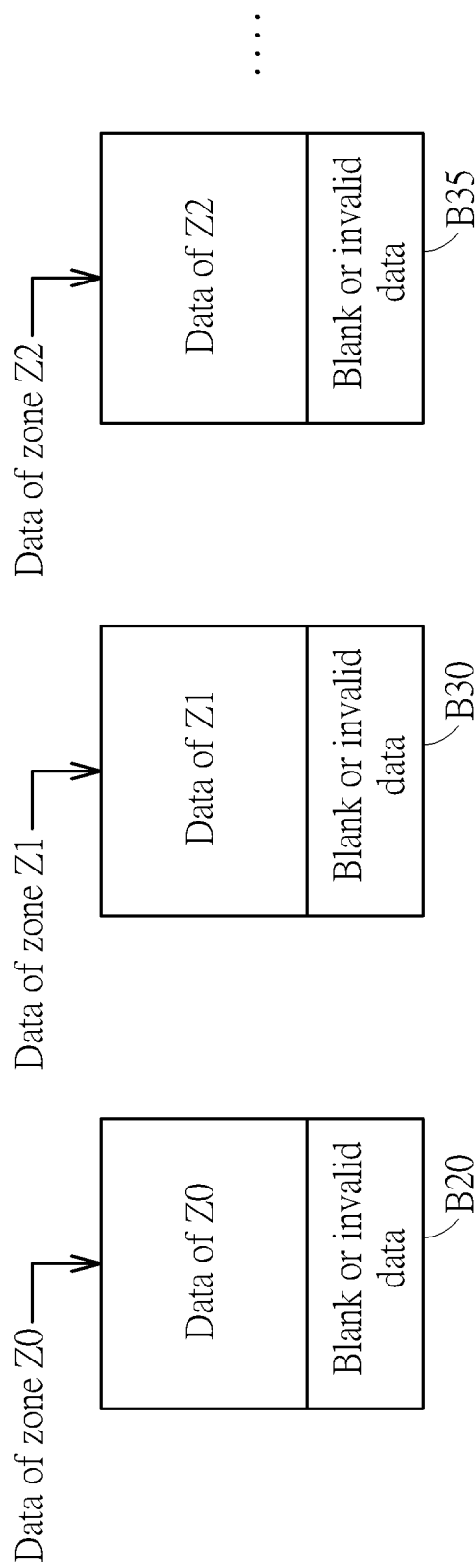
FIG. 15 is a diagram illustrating writing data of the zone to the block in the flash memory module.

FIG. 14 is a flowchart illustrating writing data from the host device 110 to the zoned namespace 310_1 according to an embodiment of the present invention. In this embodiment, it is assumed that the amount of data corresponding to each zone is smaller than the size of each block in the flash memory module 124. In step 1400, the flow starts. The host device 110 and the storage device 120_1 are powered on and the initialization operation is completed. The host device 110 sets the storage device 120_1 with basic settings (e.g., the size of each zone, the number of zones, and the size of the logical block address) by using, for example, the Zoned Namespaces Command Set. In step 1402, the host device 110 sends a write command and corresponding data to the flash memory controller 122, where the above-mentioned data is data corresponding to one or more zones, such as the data corresponding to the logical addresses LBA_k-LBA_(k+x−1) in the zone Z3 in FIG. 4. In step 1404, the flash memory controller 122 selects at least one block (e.g., a blank block, also known as a spare block) from the zoned namespace 310_1, and writes the data of the host device 110 in the order of logical addresses into the at least one block. In the present embodiment, a block is only used to store data in a single zone. Taking FIG. 15 as an example, the flash memory controller 122 writes the data of the zone Z0 to the block B20, writes the data of the zone Z1 to the block B30, writes the data of the zone Z2 to the block B35, and so on. In step 1406, after the data in each zone is completely written, the flash memory controller 122 writes the invalid data into all remaining pages in each block except remaining page(s) used for system control, or directly keeps the remaining pages blank. Taking FIG. 15 as an example, after the flash memory controller 122 writes all the data in zone Z0 to block B20, the flash memory controller 122 will keep the remaining pages of the block B20 blank or make the remaining pages of the block B20 filled with invalid data. After the flash memory controller 122 writes all the data in the zone Z1 to the block B30, the flash memory controller 122 will keep the remaining pages of the block B30 blank or make the remaining pages of the block B30 filled with invalid data. After the flash memory controller 122 writes all the data in the zone Z2 into the block B35, the flash memory controller 122 will keep the remaining pages of the block B35 blank or make the remaining pages of the block B35 filled with invalid data.

Please note that, in one embodiment, the host device 110 sends write commands to the continuous logical addresses of the zones Z0, Z1 and Z2, and the flash memory controller 122 selects the blocks B20, B30 and B35 configured to store data belonging to the zones Z0, Z1 and Z2. Since the zone size set by the host device 110 is not aligned with the size of the physical block, the data to be written by the host device 110 still cannot fully fill the storage space of the physical block, for example, the storage space used to store host data in physical block B20 cannot be fully filled. Therefore, the flash memory controller 122 still needs to leave the storage space in the physical block B20 blank or fill in invalid data. Although the host device 110 sends write commands to the continuous logical addresses in the zones Z0 and Z1 and there is still space available to store data in the physical block B20, the flash memory controller 122 still does not store the data corresponding to the starting logical address of the zone Z1 in the physical block B20. In other words, even if the host device 110 sends a write command for data writing of continuous logical addresses (for example, a write command comprising the last logical address of the zone Z0 and the first logical address of the zone Z1) and a specific physical block (e.g., the physical block B20) has enough space to store the data of the continuous logical addresses, the flash memory controller 122 still does not continuously store the data corresponding to the continuous logical addresses in the specific physical block. Instead, the flash memory controller 122 jumps to another physical block (e.g., the block B30) to write the data corresponding to the first logical address of the zone Z1. Correspondingly, if the host device 110 sends a read command data reading of for consecutive logical addresses in the zones Z0 and Z1 (for example, a read command comprising the last logical address of the zone Z0 and the first logical address of the zone Z1), after the flash memory controller 122 reads the data stored in the physical block B20 corresponding to the last logical address of the zone Z1, it also jumps to the block B30 to read the first storage position of the block B30, to obtain the data of the first logical address of the zone Z1.

In step 1408, the flash memory controller 122 creates or updates an L2P mapping table to record the mapping relationship between the logical addresses and the physical addresses for subsequent data reading from the zoned namespace 310_1.FIG. 16 is a diagram illustrating the L2P mapping table 1600 according to an embodiment of the present invention. The L2P mapping table 1600 comprises two fields. One field records the zone numbers or related identifiable content, and the other field records the physical block addresses of the blocks. Referring to FIG. 16 in conjunction with FIG. 6, since the data of the zones Z0, Z1 and Z2 are written to the blocks B20, B30 and B35, respectively, the L2P mapping table 1600 records the zone Z0 and the physical block addresses PBA20 of the block B20, the zone Z1 and the physical block addresses PBA30 of the block B30, and the zone Z3 and the physical block addresses PBA35 of the block B35. In another embodiment, the above-mentioned zone numbers are represented by the starting logical addresses of the zones, or the block numbers can be linked to the starting logical addresses of the blocks through another lookup table. For example, assuming that the zone Z0 is used to store data with logical addresses LBA_1-LBA_2000, the zone Z1 is used to store data with logical addresses LBA_2001-LBA_4000, and the zone Z2 is used to store data with logical addresses LBA_4001-LBA_6000, the starting logical addresses of the zones Z0, Z1 and Z2 are LBA_1, LBA_2001 and LBA_4001, respectively. Please note that in this embodiment, each physical block corresponds to only one zone. For example, the blocks B20, B30 and B35 only correspond to zones Z0, Z1 and Z2, respectively. In other words, a single block only stores data in a single zone. For example, the block B20 only stores data corresponding to the zone Z0, the block B30 only stores data corresponding to the zone Z1, and the block B35 only stores data corresponding to the zone Z2. In the above embodiment, the data stored in any physical block in the zoned namespace 310_1 must belong to the same zone, that is, the logical addresses of all data stored in any physical block will belong to the same zone. Therefore, the L2P mapping table 1600 of this embodiment may include only the physical block addresses of the zoned namespace 310_1, and does not include any page addresses, that is, the L2P mapping table 1600 does not record serial numbers of pages or related page information in any block. In addition, the L2P mapping table 1600 only records the zone number or the starting logical address of each zone. Therefore, the L2P mapping table 1600 has only a small amount of data, so the L2P mapping table 1600 can stay resident in the buffer memory 216 or the DRAM 240 without causing burden on the storage space of the buffer memory 216 or the DRAM 240. In one embodiment, the physical block address recorded in the above-mentioned L2P mapping table 1600 can be additionally accompanied by the physical page address of the first page, and adding an additional physical page address will not cause burden on storage space in practice. Please notice that after the host device 110 sets the zone size and the number of zones, the starting logical address of each zone is determined. Therefore, similarly, the L2P mapping table 1600 can be further simplified into one field, that is, only one field of the physical block address, and the logical address field can be represented by entries of the table. There is no need to actually store the starting logical addresses of multiple zones.

In addition, if the host device 110 wants to reset a zone, such as the zone Z1, the flash memory controller 122 usually amends the L2P mapping table 1600 to delete the field values recording physical block addresses corresponding to the zone Z1. For example, the physical block address PBA3 in the L2P mapping table 1600 is deleted, which means that the host no longer needs the data stored in these physical blocks. The flash memory controller 122 can erase these physical blocks later. Please notice that the physical block B30 stores the data to be stored by the host device 110 and the invalid data. Although the zone Z1 to be reset by the host device 110 does not include the invalid data stored in the physical block B30, for the convenience of management, the flash memory controller 122 will still delete the physical block address PBA30 in the L2P mapping table 1600 as a whole after receiving the reset command regarding the zone Z1 from the host device 110. Furthermore, before the flash memory controller 122 erases the physical block B30, it does not move the invalid data that is not included in the reset command from the host device 110 to other physical blocks. Instead, the flash memory controller 122 deletes the entire physical block directly.

Figure 17:
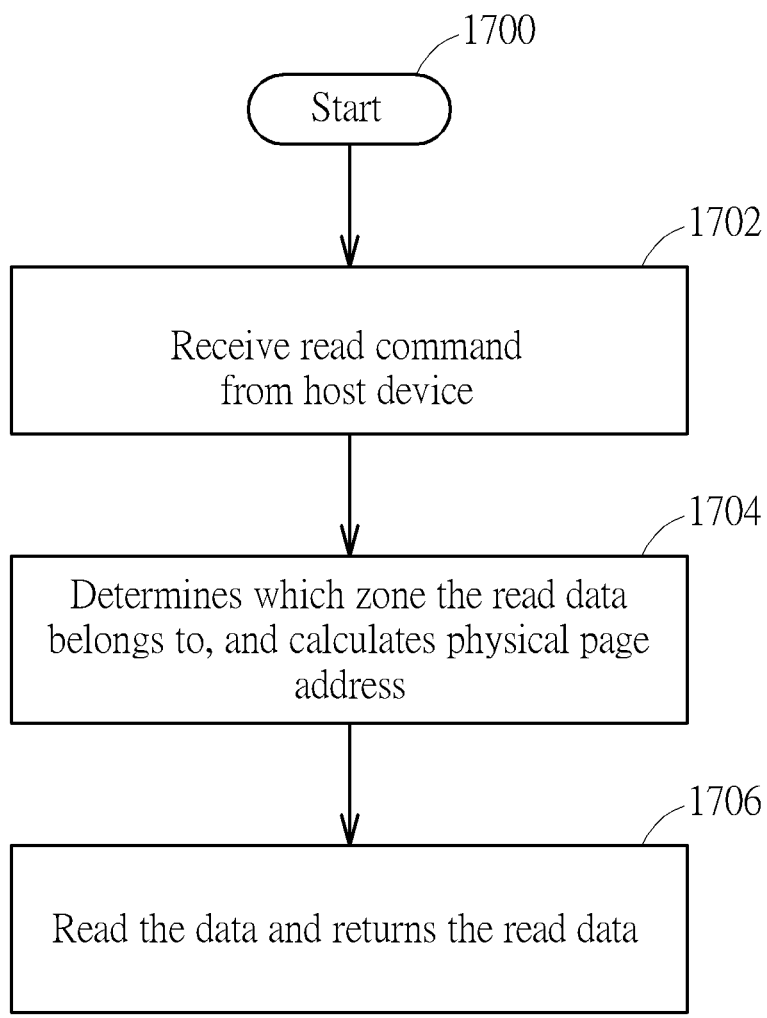
FIG. 17 is a flowchart illustrating reading data from the zoned namespace according to another embodiment of the present invention.

FIG. 17 is a flowchart illustrating reading data from the zoned namespace 310_1 according to another embodiment of the present invention. In this embodiment, it is assumed that the zoned namespace 310_1 has already stored the data of the zones Z0, Z1, and Z2 shown in FIG. 15. In step 1700, the flow starts, and the host device 110 and the storage device 120_1 are powered on and the initialization operation (for example, the boot procedure) is completed. In step 1702, the host device 110 sends a read command to request reading of data with a specific logical address. In step 1704, the microprocessor 212 in the flash memory controller 122 determines which zone the specific logical address belongs to, and calculates a physical page address corresponding to the specific logical address according to the logical address recorded in the L2P mapping table 1600. Take the L2P mapping table 1600 in FIG. 16 as an example for illustration. The L2P mapping table 1600 records the zone number or starting logical address of each zone, and the number of logical addresses of each zone is already known. Therefore, the microprocessor 212 can know which zone the specific logical address belongs to from the above information. For example, a zone comprises 2000 logical addresses. The microprocessor 212 divides the logical address (e.g., the specific logical address) to be accessed by the host by 2000, and the quotient obtained is the zone where the specific logical address is located. Take the embodiment shown in FIGS. 15 and 16 as an example for illustration. Assuming that the microprocessor 212 finds the quotient of the specific logical address divided by 2000 is 1, it can determine that the specific logical address belongs to the zone Z1. The microprocessor 212 then determines the physical page address corresponding to the specific logical address, according to the difference between the specific logical address and the starting logical address of the zone Z1 (the difference is also the remainder obtained after the microprocessor 212 divides the specific logical address by 2000), and according to how many pieces of data with different logical addresses that can be stored in each page of the block. For the convenience of explanation, assuming that each page in the block can only store data of one logical address, and the difference between the specific logical address and the starting logical address of the zone Z1 is 200 logical addresses. The microprocessor 212 can calculate that the specific logical address corresponds to the physical page address of the $200^{th}$ page of the block B20.

In step 1706, the microprocessor 212 reads the corresponding data from the zoned namespace 310_1 according to the physical block address and the physical page address determined in step 1704, and returns the read data to the host device 110.

As described above, when the flash memory controller 122 only creates a small-sized L2P mapping table 700/720, the flash memory controller 122 can still effectively complete the writing and reading of data in the zoned namespace 310_1. However, in this embodiment, a large amount of physical block storage space is still wasted, such as the blank pages or invalid pages shown in FIG. 15.

Figure 18:
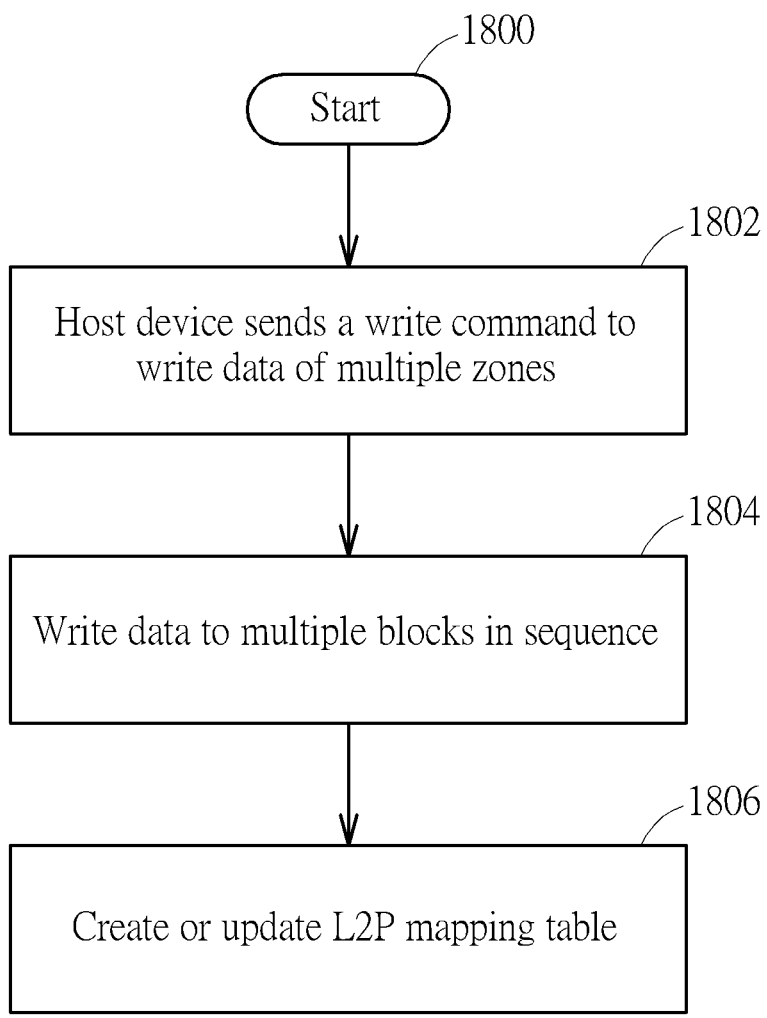
FIG. 18 is a flowchart illustrating writing data from the host device to the zoned namespace according to another embodiment of the present invention.
Figure 19:
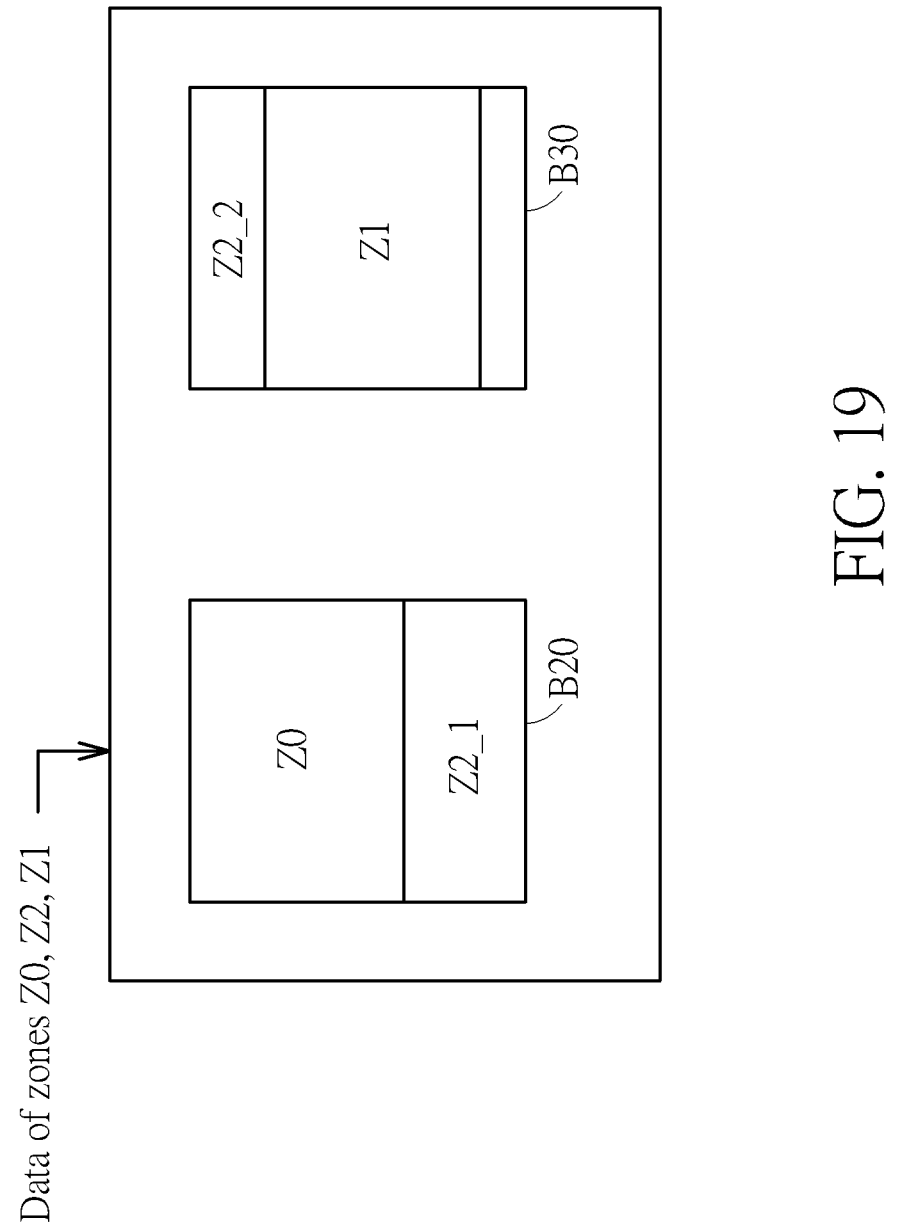
FIG. 19 is a diagram illustrating writing data of the zone to the block in the flash memory module.
Figure 20:
FIG. 20 is a diagram illustrating the L2P mapping table according to an embodiment of the present invention.

FIG. 18 is a flowchart illustrating writing data from the host device 110 to the zoned namespace 310_1 according to another embodiment of the present invention. In this embodiment, it is assumed that the amount of data corresponding to each zone is smaller than the size of each block in the flash memory module 124. In step 1800, the process starts, the host device 110 and the storage device 120_1 are powered on and the initialization operation is completed. The host device 110 sets the storage device 120_1 with basic settings (e.g., the size of each zone, the number of zones, and the size of the logical block address) by using, for example, the Zoned Namespaces Command Set. In step 1802, the host device 110 sends a write command and corresponding data to the flash memory controller 122, where the above-mentioned data is data corresponding to one or more zones, such as the data corresponding to logic addresses LBA_k-LBA_(k+x−1) of the zone Z3 in FIG. 4. In step 1804, the flash memory controller 122 selects at least one block (e.g., a blank block, also known as a spare block) from the zoned namespace 310_1, or selects multiple blank blocks and a shared block. The data of the host device 110 is written into these blocks in sequence according to the logical address sequence in a zone. For example, referring to FIG. 19, the flash memory controller 122 can sequentially write the data of the zones Z0, Z2 and Z1 into the blocks B20 and B30 in the order of logical addresses. Taking FIG. 19 as an example, the first data of the zone Z0 is written from the first page of the block B20, and after all the data in the zone Z0 is written, the flash memory controller 122 changes an availability indicator corresponding to the zone number Z0 from 0 to 1 in the L2P mapping table 2000 (which is shown in FIG. 20 and will be described in detail below), which means that the data of the zone number Z0 has been written, and the remaining space of the physical block PBA20 stored in the zone number Z0 can be reused to store other data. Since the remaining space of the physical block PBA20 can be reused to store other data, the data in zone Z2 can also be written to the remaining pages of block B20. If the flash memory controller 122 cannot find any physical block whose corresponding availability indicator is 1 when dealing with the write command regarding the zone Z2, the flash memory controller 122 should pick a blank block or spare block for storing data of the zone Z2.

In this embodiment, since the availability indicator corresponding to the physical block PBA20 is 1, the flash memory controller 122 can directly use the physical block PBA20 to store data of the zone Z2 without picking another blank block or spare block. Since the number of remaining pages in block B20 is not enough to store all the data in the zone Z2, the data in zone Z2 is divided into the first part Z2_1 and the second part Z2_2, wherein the first part Z2_1 is stored in the block B20, and the second part Z2_2 is stored into another blank block (the block B30) picked by the flash memory controller 122 and written from the first page of block B30. After the remaining pages of block B20 are filled with data of the first part Z2_1 of zone Z2, the physical block PBA20 is full and can store data no more. Hence, the flash memory controller 122 will change the availability indicator corresponding to zone Z0 to 0, and keep the availability indicator corresponding to zone Z2_1 at 0. After the writing of the second part Z2_2 of zone Z2 is completed, the flash memory controller 122 changes the availability indicator corresponding to zone number Z2_2 from 0 to 1. Similarly, the data in the zone Z1 also starts to be written into the remaining pages of the block B30.

In step 1806, the flash memory controller 122 creates or updates an L2P mapping table to record the mapping relationship between the logical addresses and the physical addresses for subsequent data reading from the zoned namespace 310_1. FIG. 20 is a diagram illustrating the L2P mapping table 2000 according to an embodiment of the present invention. The L2P mapping table 2000 comprises two fields. One field records the block numbers or logical address ranges, and the other field records the physical block address and the physical page address corresponding to the first logical address of each logical address range. In FIG. 20, the L2P mapping table 2000 records the first logical address of the logical address range of the zone Z0 (or the zone Z0), and the corresponding physical block address PBA20 and the physical page address P1; the logical address range of the first part Z2_1 of the zone Z2 and the physical block address PBA20 and the physical page address Pa corresponding to the first logical address of the range; the logical address range of the second part Z2_2 of the zone Z2 and the physical block address PBA30 and the physical page address P1 corresponding to the first logical address of the range; and the logical address range of the zone Z1 (or the zone Z1) and the physical block address PBA30 and the physical page address Pb corresponding to the first logical address of the zone. Please note that in this embodiment, any physical block fully filled with data stores the data of multiple zones.

In addition, it should be noticed that in the process of writing the data of the zones Z0, Z2 and Z1, the writing process may not start to write the data of the zone Z1 to the zone namespace 310_1 after all data in the zone Z0 has been written to the zone namespace 310_1. In other words, it is possible that when the data in the zone Z0 has not been written completely, the flash memory controller 122 needs to start writing the data in the zone Z1 to the zone namespace 310_1. Therefore, according to described above, in another embodiment of the present invention, the L2P mapping table 2000 may additionally include an availability indicator field, which is used to indicate whether the data of the zone has been completely written in the shared block.

In the above embodiment, since the L2P mapping table 2000 stores the address relationships of the data corresponding to different zones in the block, it can be regarded that the data with logical addresses belonging to different zones can be stored in the same physical block, such that the space of the physical block can be effectively used.

It should be noted that the L2P mapping table 2000 of this embodiment only records a small number of logical addresses (a small number of physical page addresses), so the L2P mapping table 2000 has only a small amount of data, such that L2P The mapping table 2000 can stay resident in the buffer memory 216 or the DRAM 240 without causing burden on the storage space of the buffer memory 216 or the DRAM 240.

Figure 21:
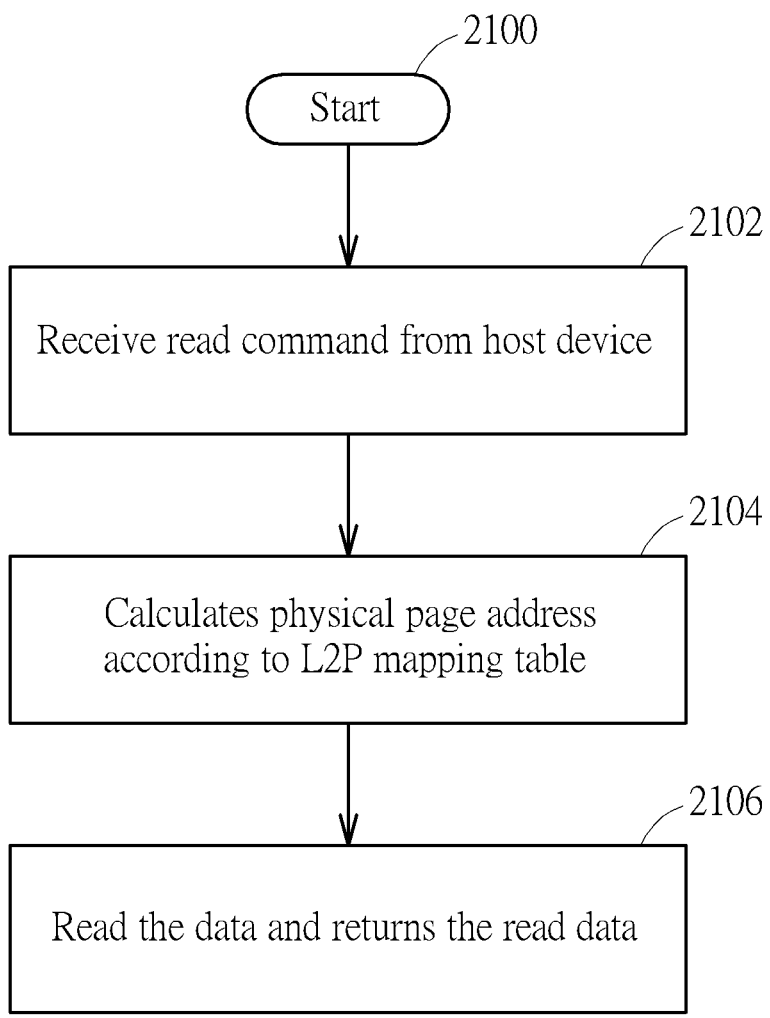
FIG. 21 is a flowchart illustrating reading data from the zoned namespace according to an embodiment of the present invention.

FIG. 21 is a flowchart illustrating reading data from the zoned namespace 310_1 according to an embodiment of the present invention. In this embodiment, it is assumed that the zone namespace 310_1 has already stored the data of the zones Z1, Z1 and Z2 shown in FIG. 19. In step 2100, the flow starts, the host device 110 and the storage device 120_1 are powered on and the initialization operation (for example, the boot procedure) is completed. In step 2102, the host device 110 sends a read command to request reading of data with a specific logical address. In step 2104, the microprocessor 212 in the flash memory controller 122 determines which zone the specific logical address belongs to, and calculates a physical page address corresponding to the specific logical address according to the zone number or logical address recorded in the L2P mapping table 2000. Take the L2P mapping table 2000 in FIG. 20 as an example for illustration. The L2P mapping table 2000 records the block number or a logical address range of each zone, and the number of logical addresses that can be stored in each block is already known. Therefore, the microprocessor 212 can know which zone and which block the specific logical address belongs to from the above information. Then, assuming that the specific logical address belongs to the zone Z0, the microprocessor 212 determines the physical page address corresponding to the specific logical address by referring to the difference between the specific logical address and the starting logical address of the zone Z0 and further referring to how many pieces of data with different logical addresses that can be stored in each page of the block.

In step 2106, the microprocessor 212 reads the corresponding data from the zoned namespace 310_1 according to the physical block address and the physical page address determined in step 2104, and returns the read data to the host device 110.

As described above, through the content described in the above embodiments, when the flash memory controller 122 can only create a small-sized L2P mapping table 2000, the flash memory controller 122 can still effectively complete the writing and reading of data in the zoned namespace 310_1.

Referring to the embodiments shown in FIGS. 5 to 21 above, FIGS. 5 to 7 describe that the amount of data corresponding to each zone is greater than the size of each block in the flash memory module 124, and each block in the flash memory module 124 only stores data corresponding to a single zone. That is, data in different zones will not be written into the same physical block. FIGS. 8-12 describe that the amount of data corresponding to each zone is greater than the size of each block in the flash memory module 124, and some blocks in the flash memory module 124 store the data corresponding to multiple zones. That is, data in different zones can be written into the same physical block. FIGS. 13-17 describe that the amount of data corresponding to each zone is smaller than the size of each block in the flash memory module 124, and each block in the flash memory module 124 only stores data corresponding to a single zone. That is, data in different zones will not be written into the same physical block. FIGS. 18-21 describe that the amount of data corresponding to each zone is smaller than the size of each block in the flash memory module 124, and the blocks in the flash memory module 124 store data corresponding to multiple zones. That is, data in different zones can be written into the same physical block.

In one embodiment, the above-mentioned four access modes can be selectively applied to the zoned namespace of the flash memory module 124, and if the flash memory module 124 has multiple zoned namespaces, these zoned namespaces can also adopt different access modes. Specifically, referring to FIG. 3, the microprocessor 212 in the flash memory controller 122 can select the access mode to be used according to the size of each zone in the zoned namespace 310_1. For example, if the amount of data corresponding to each zone of the zoned namespace 310_1 is greater than the size of each block in the flash memory module 124, the microprocessor 212 can use the access mode mentioned in FIGS. 5-7 or the access mode mentioned in FIGS. 8-12 to access the zoned namespace 310_1; if the amount of data corresponding to each zone in the zoned namespace 310_2 is smaller than the size of each block in the flash memory module 124, the microprocessor 212 can use the access mode mentioned in FIGS. 13-17 or the access mode mentioned in FIGS. 18-21 to access the zoned namespace 310_2. Similarly, the microprocessor 212 in the flash memory controller 122 can select the access mode to be used according to the size of each zone of the zoned namespace 310_2, and the access mode adopted by the zoned namespace 310_2 does not have to be the same as the zoned namespace 310_1. For example, the zoned namespace 310_1 can adopt the access mode mentioned in FIGS. 5-7, and the zoned namespace 310_2 can adopt the access mode mentioned in FIGS. 8-12.

Please note that the flash memory controller 122 cannot know the size of the zone to be set by the host device 110 in advance. In order to make the flash memory controller 122 work with all host devices which meet the specification, the flash memory controller 122 must be capable of executing all the access methods of the embodiments shown in FIGS. 5-21. For example, after knowing the size of a single physical block of the flash memory module 124 (or the size of a super block which will be detailed below) and the zone size set by the host device 110, the flash memory controller 122 can arrange the actual memory space actually used by the host device according to the physical block size and the zone size, and can choose which one of the above four access modes should be used to access.

If the size of the zone is smaller than the size of the physical block, the flash memory controller 122 has to select the methods shown in FIGS. 13-21 for access. Because the access mode mentioned in FIGS. 13-17 may waste a lot of memory space, it may even cause the flash memory controller 122 to fail to arrange enough memory space for the host. For example, according to this access mode, the flash memory controller 122 can only arrange a capacity of 1.2 TB for the host device 110 to use from a flash memory module with a total capacity of 2 TB, and the host device may expect the capacity of at least 1.5 TB to be used. Hence, the flash memory controller 122 needs to change its access mode. For example, the flash memory controller 122 can use the method shown in FIGS. 18-21 for access instead. Since this access mode will greatly reduce the waste of flash memory space, the flash memory controller 122 can arrange more capacity for the host device 110. For example, the flash memory controller 122 can arrange a capacity of 1.8 TB for the host device 110 to use from a flash memory module with a total capacity of 2 TB. As a result, the memory storage space requirement of the host device 110 can be met. In other words, the capacity that the host device 110 may expect can be regarded as a standard, and when the zoned namespace adopts the access mode of FIGS. 13-17 and the planned capacity is greater than the standard of the host device 110, the flash memory controller 122 can select the access methods shown in FIGS. 13-17; in addition, if the planned capacity of the zoned namespace is lower than the standard of the host device 110 when the access mode in FIGS. 13-17 is used, the flash memory controller 122 can select the access mode in FIGS. 18-21.

If the size of the zone is greater than the size of the physical block, the flash memory controller 122 has to select the method shown in FIGS. 5-12 for access. Because the access modes mentioned in FIGS. 5-7 may waste a lot of memory space, it may even cause the flash memory controller 122 to fail to arrange enough memory space for the host. For example, according to this access mode, the flash memory controller 122 can only arrange a capacity of 1.2 TB for the host device 110 to use from a flash memory module with a total capacity of 2 TB, and the host device may expect the capacity of at least 1.5 TB to be used. Hence, the flash memory controller 122 needs to change its access mode. For example, the flash memory controller 122 can employ the method shown in FIGS. 8-12 for access instead. Since this access mode will greatly reduce the waste of flash memory space, the flash memory controller 122 can arrange more capacity for the host device 110. For example, the flash memory controller 122 can arrange a capacity of 1.8 TB for the host device 110 to use from a flash memory module with a total capacity of 2 TB. As a result, the memory storage space requirement of the host device 110 can be met. In other words, the capacity that the host device 110 may expect can be regarded as a standard, and when the zoned namespace adopts the access mode of FIGS. 5-7 and the planned capacity is greater than the standard of the host device 110, the flash memory controller 122 can select the access methods shown in FIGS. 5-7; in addition, if the planned capacity of the zoned namespace is lower than the standard of the host device 110 when the access mode in FIGS. 5-7 is used, the flash memory controller 122 can select the access mode in FIGS. 8-12.

Figure 25:
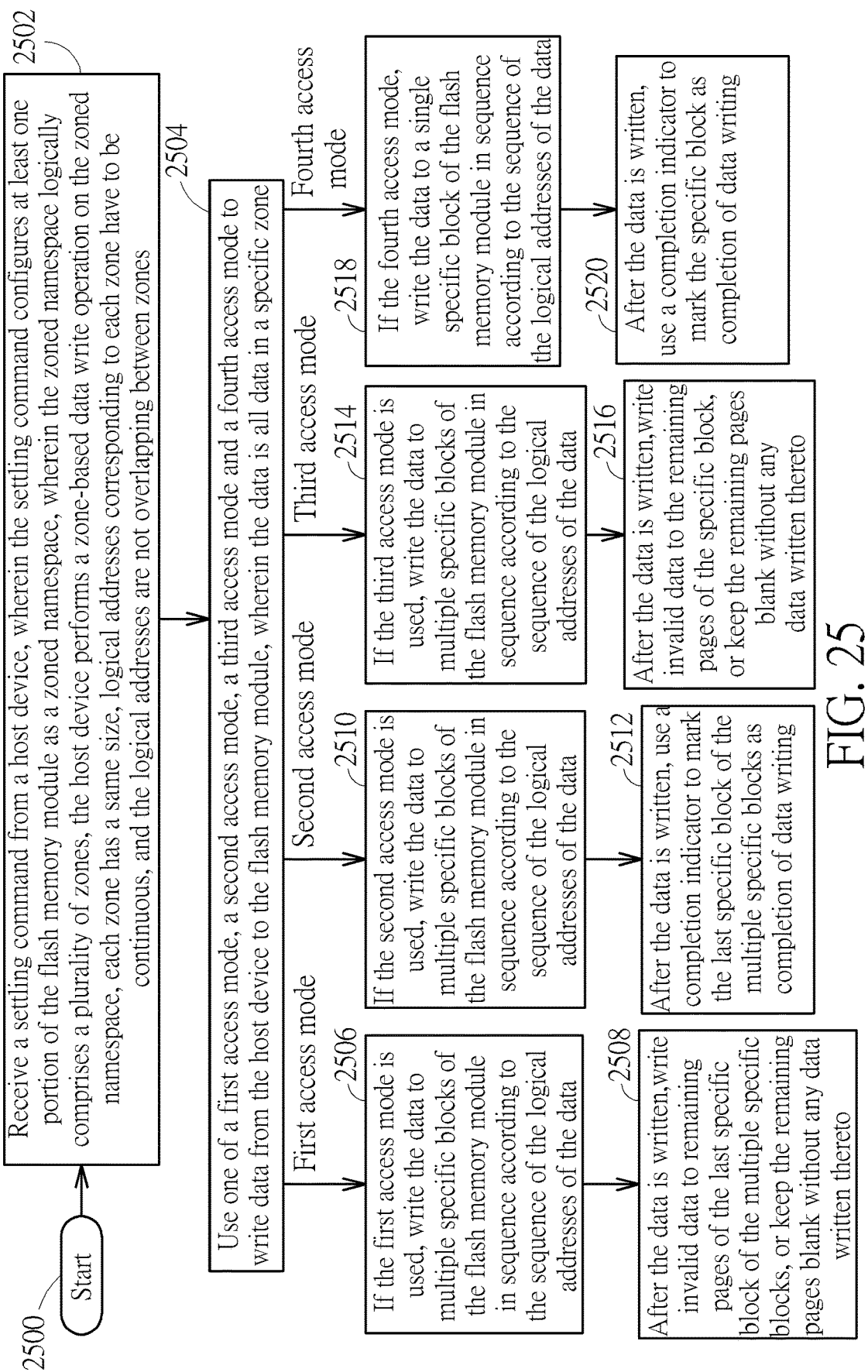
FIG. 25 is a flowchart illustrating a control method of a flash memory controller according to an embodiment of the present invention.

FIG. 25 is a flowchart illustrating a control method of a flash memory controller according to an embodiment of the present invention. With reference to the content described in the above embodiments, the flow of the control method is as follows:

Step 2500: Start;

Step 2502: Receive a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone have to be continuous, and the logical addresses are not overlapping between zones;

Step 2504: Use one of a first access mode, a second access mode, a third access mode and a fourth access mode to write data from the host device to the flash memory module, wherein the data is all data in a specific zone;

Step 2506: If the first access mode is used, write the data to multiple specific blocks of the flash memory module in sequence according to the sequence of the logical addresses of the data;

Step 2508: After the data is written, write invalid data to remaining pages of the last specific block of the multiple specific blocks, or keep the remaining pages blank without any data written thereto;

Step 2510: If the second access mode is used, write the data to multiple specific blocks of the flash memory module in sequence according to the sequence of the logical addresses of the data;

Step 2512: After the data is written, use a completion indicator to mark the last specific block of the multiple specific blocks as completion of data writing;

Step 2514: If the third access mode is used, write the data to multiple specific blocks of the flash memory module in sequence according to the sequence of the logical addresses of the data;

Step 2516: After the data is written, write invalid data to the remaining pages of the specific block, or keep the remaining pages blank without any data written thereto;

Step 2518: If the fourth access mode, write the data to a single specific block of the flash memory module in sequence according to the sequence of the logical addresses of the data; and Step 2520: After the data is written, use a completion indicator to mark the specific block as completion of data writing.

Please notice that in another embodiment, in order to make the design of the controller 122 simpler, the controller 122 may support only one of the above four access modes, or the controller 122 may support only two of the above four access modes, or the controller 122 may support only three of the above four access modes. It must be designed according to the specific flash memory module and host device.

In addition, in an embodiment of the present invention, the storage device 120_1 may be a Secure Digital Memory Card, which supports data transmission in the traditional secure digital mode, that is, the UHS-I input/output communication interface standard is used to communicate with the host device 110, and also supports the PCIe mode that supports both the PCIe channel and the NVMe protocol.

Figure 22:
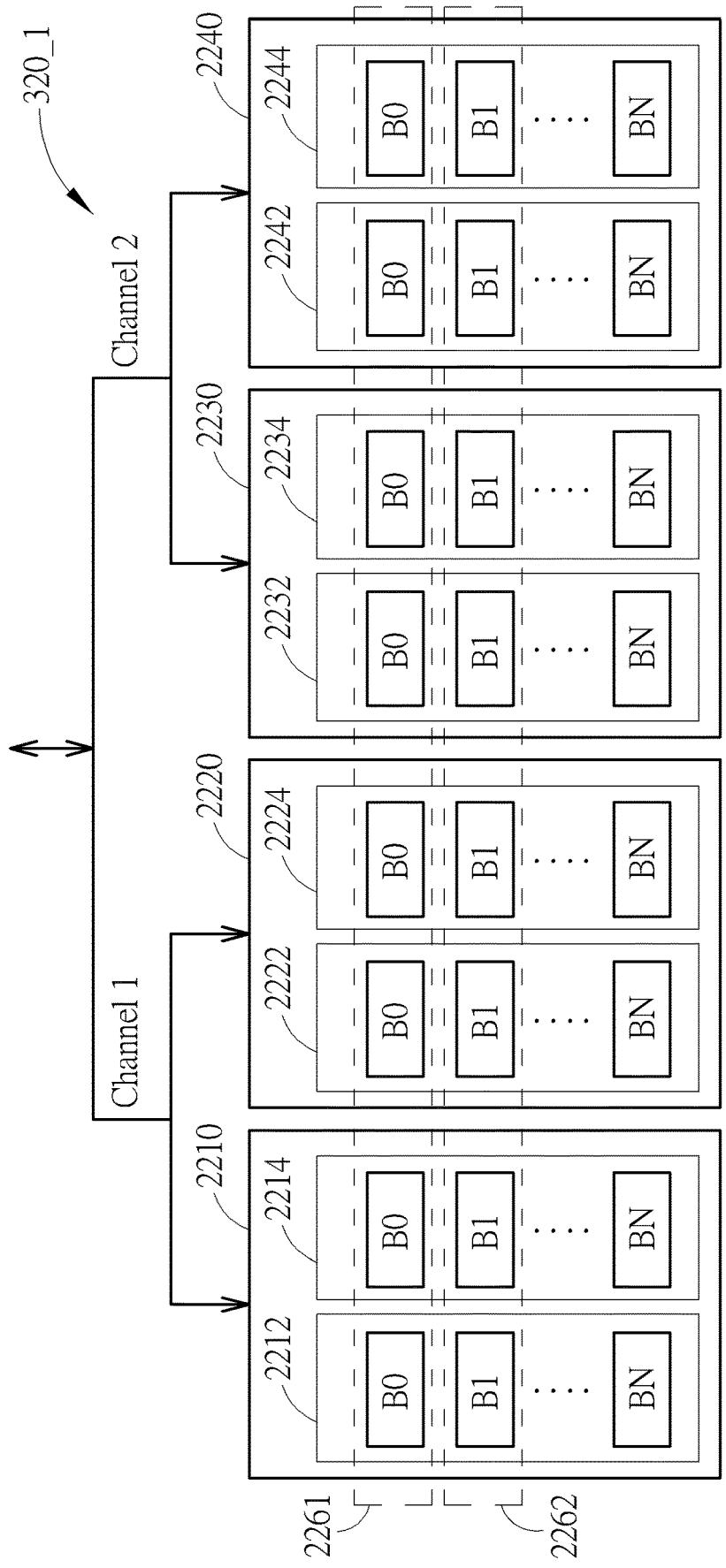
FIG. 22 is a diagram illustrating a super block in the general storage space.

With regard to actual implementation of the flash memory module 124, the flash memory controller 122 configures the blocks belonging to different planes in the flash memory module 124 into a super block to facilitate the management of data access. Specifically, referring to the diagram of the general storage space 320_1 of the flash memory module 124 as shown in FIG. 22, the general storage space 320_1 comprises two channels, channel 1 and channel 2, which are respectively connected to multiple flash memory chips 2210, 2220, 2230 and 2240, wherein the flash memory chip 2210 includes two planes 2212, 2214, the flash memory chip 2220 includes two planes 2222, 2224, the flash memory chip 2230 includes two planes 2232. 2234, the flash memory chip 2240 includes two planes 2242, 2244, and each plane includes multiple blocks B0-BN. In the process of configuring or initializing the general storage space 320_1, the flash memory controller 122 configures first blocks B0 of all planes as a super block 2261, second blocks B1 of all planes as a super block 2262, and so on. As shown in FIG. 22, the super block 2261 comprises eight physical blocks, and the flash memory controller 122 treats the super block 2261 as a normal block when accessing the super block 2261. For example, the super block 2261 itself is an erasing unit, that is, although the eight blocks B0 of the super block 2261 can be erased separately, the flash memory controller 122 must erase the eight blocks B0 together. In addition, data writing of the super block 2261 can be performed upon the first page of the plane 2212, the first page of the plane 2214, the first page of the plane 2222, and the first page of the plane 2224, sequentially. After the data writing of the first page of the plane 2244 is completed, the subsequent data is written sequentially to the second page of the plane 2212, the second page of the plane 2214, and so on. In other words, the flash memory controller 122 does not start data writing of the second page of each block B0 in the super block 2261 until data writing of the first page of each block B0 in the super block 2261 is completed. The super block is a logical collection block set by the flash memory controller 122 to facilitate management of the storage space 320_1, and is not a physical collection block. In addition, when performing garbage collection, calculating effective pages of block, and calculating block write time, the control can also perform the calculations in units of super blocks. Under the teaching of the present invention, those skilled in the art can use the embodiments shown in FIGS. 5-21 to understand that a physical block mentioned in the embodiments shown in FIGS. 5-21 is can also be a super block, and all related embodiments can be implemented by using a super block without being limited to a single physical block.

However, when the flash memory controller 122 configures the blocks in the flash memory module 124 as a super block, if the embodiments in FIGS. 5-7 are used for data access, it is very likely that there are many remaining pages (blank pages) in each block, such that the internal space of the flash memory module 124 is wasted. For example, assuming that the amount of data of the zone arranged by the host device 110 is about the size of six physical blocks, the amount of data stored in the super block 2261 containing eight blocks will only be the size of six physical blocks. That is, the storage space of about two blocks in the super block 2261 is wasted due to being blank or storing invalid data. Therefore, an embodiment of the present invention proposes a method for configuring the zoned namespace 310_1 according to the data amount of the zone set by the host device 110, so as to efficiently use the zoned namespace 310_1.

Figure 23:
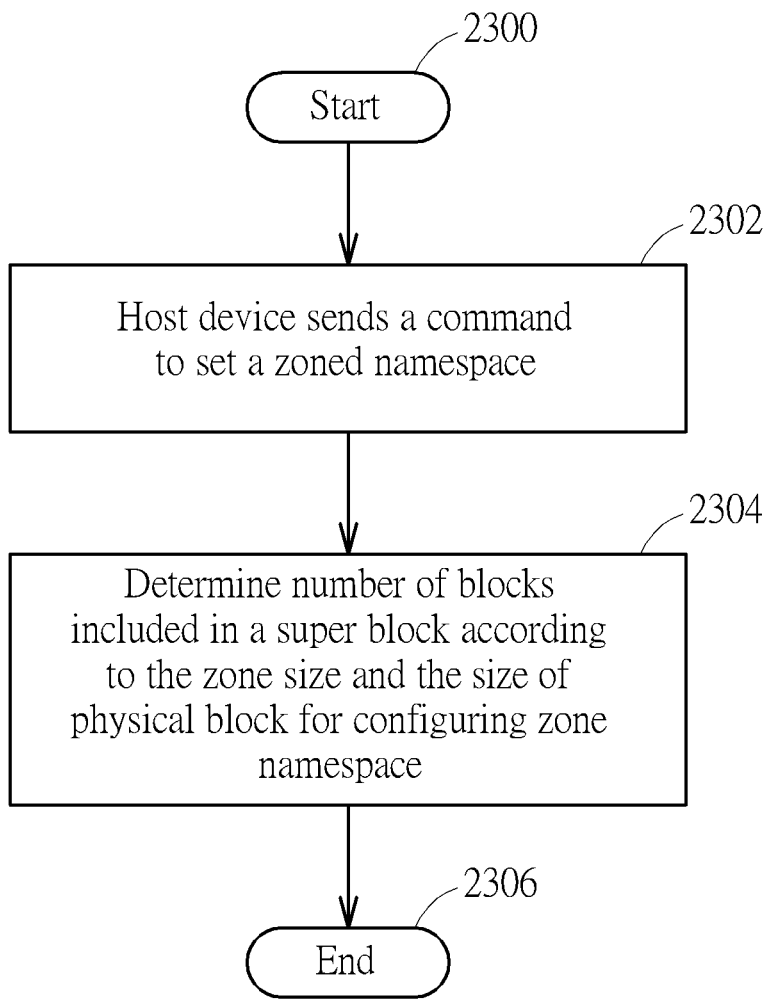
FIG. 23 is a flowchart illustrating a method of configuring the flash memory module according to an embodiment of the present invention.

FIG. 23 is a flowchart illustrating a method of configuring the flash memory module 124 according to an embodiment of the present invention. In step 2300, the flow starts, and the host device 110, the flash memory controller 122 and the flash memory module 124 have completed related initialization operations. In step 2302, the host device 110 sets at least a part of the flash memory module 124 as a zoned namespace by sending a settling command set. In the following description, the zoned namespace 310_1 is used as an example for illustration. For example, the host device 110 sets the basic settings (e.g., a zone size, a number of zones, and a logical block address size in the zoned namespace 310_1) by using, for example, the Zoned Namespaces Command Set. In step 2304, the microprocessor 212 in the flash memory controller 122 determines the number of blocks included in a super block according to the zone size set by the host device 110 and the size of each block (physical block) in the flash memory module 124. Specifically, assume that the zone size of the zone set by the host device 110 is A, and the size of each physical block in the flash memory module 124 for storing zone data is B. If the remainder obtained by the microprocessor 212 after dividing A by B is not zero, then the quotient (which is obtained by dividing A by B) plus one can be the number of blocks included in a super block. If the remainder obtained by the microprocessor 212 after dividing A by B is zero, then the quotient obtained by dividing A by B can be the number of blocks included in a super block. Taking the embodiment shown in FIG. 24 as an example, the flash memory module 124 includes a plurality of flash memory chips 2410, 2420, 2430, 2440, the flash memory chip 2410 includes two planes 2412, 2414, the flash memory chip 2420 includes two planes 2422, 2424, the flash memory chip 2430 includes two planes 2432, 2434, the flash memory chip 2440 includes two planes 2442, 2444, and each plane contains multiple blocks B0-BN. If the quotient of A divided by B is '5' and the remainder is '3', the microprocessor 212 can determine that a super block contains six blocks. Therefore, during the process of configuring or initializing the zoned namespace 310_1, the flash memory controller 122 configures the first blocks B0 of the planes 2412, 2414, 2422, 2424, 2432, 2434 as a super block 2461, configures the second blocks B1 of the planes 2412, 2414, 2422, 2424 as a super block 2462, and so on. In addition, the blocks B0-BN of the plane 2442 and the plane 2444 do not need to be configured as super blocks, or may be configured as super blocks that are independent of the planes 2412, 2414, 2422, 2424, 2432, 2434. In another embodiment, during the process of configuring or initializing the zone namespace 310_1, the flash memory controller 122 configures the first blocks B0 of the planes 2412, 2414, 2422, 2424, 2432, 2434 as a super block 2461, and configures the second blocks B1 of the planes 2422, 2424, 2432, 2434, 2442, 2444 as a super block 2462. As long as blocks in the same super block can be accessed in parallel, the super block access speed can be improved. Therefore, the super block can be set arbitrarily under this concept.

In another embodiment, it is assumed that the amount of data in the zone set by the host device 110 is C, and the size of each physical block in the flash memory module 124 for storing host data is D. If the quotient of C divided by D is '3' and the remainder is '2', the microprocessor 212 can determine that a super block contains 4 blocks, that is, the quotient plus one. After the flash memory controller 122 receives the command from the host device to set the zoned namespace 310_1, the flash memory controller 122 configures the first blocks B0 of the planes 2412, 2414, 2422, 2424 as a super block 2461, configures the first blocks B0 of the planes 2432, 2434, 2442, 2444 a super block 2462, and so on.

Please note that the storage devices 120_1-120_N can have preliminary super block settings for the flash memory module when performing the initial settings in the factory. Take the storage device 120_1 as an example. The super block setting at this time can configure the first blocks B0 of the planes 2412, 2414, 2422, 2424, 2432, 2434, 2442, 2444 that can be accessed at the same time as a super block 2461 and can configure the second blocks B1 of the planes 2412, 2414, 2422, 2424, 2432, 2434, 2442, 2444 that can be accessed at the same time as a super block 2462, so as to obtain the maximum access bandwidth. After the storage device 120_1 is connected to the host device 110 and the command of the host device 110 for the zoned namespace (for example, setting the zoned namespace 310_1) is obtained, regarding the size of the zoned namespace, a specific storage zone is designated in the flash memory module 124 as the dedicated space of the zoned namespace 310_1, and the size and the combination method of the super blocks in the specific storage space are reset on the basis of the size of each zone in the zoned namespace 310_1 that is set by the host device 110. For example, the first blocks B0 of the planes 2412, 2414, 2422, 2424 are configured as a super block 2461, the first blocks B0 of the planes 2432, 2434, 2442, 2444 are configured as a super block 2462, and so on. At this moment, there will be two super blocks of different sizes in the storage device 120_1. The setting of the super block of the specific storage zone dedicated to the zoned namespace 310_1 is different from the setting of the super block of the specific storage zone that is not dedicated to the zoned namespace 310_1. Moreover, the super block setting of the specific storage zone dedicated to the zoned namespace 310_1 is also different from the initial setting of the storage device 120_1 at the factory.

As described above, the number of blocks included in the super block is determined according to the amount of data in the zone set by the host device 110, such that the super block achieves the best space utilization.

Figure 24:
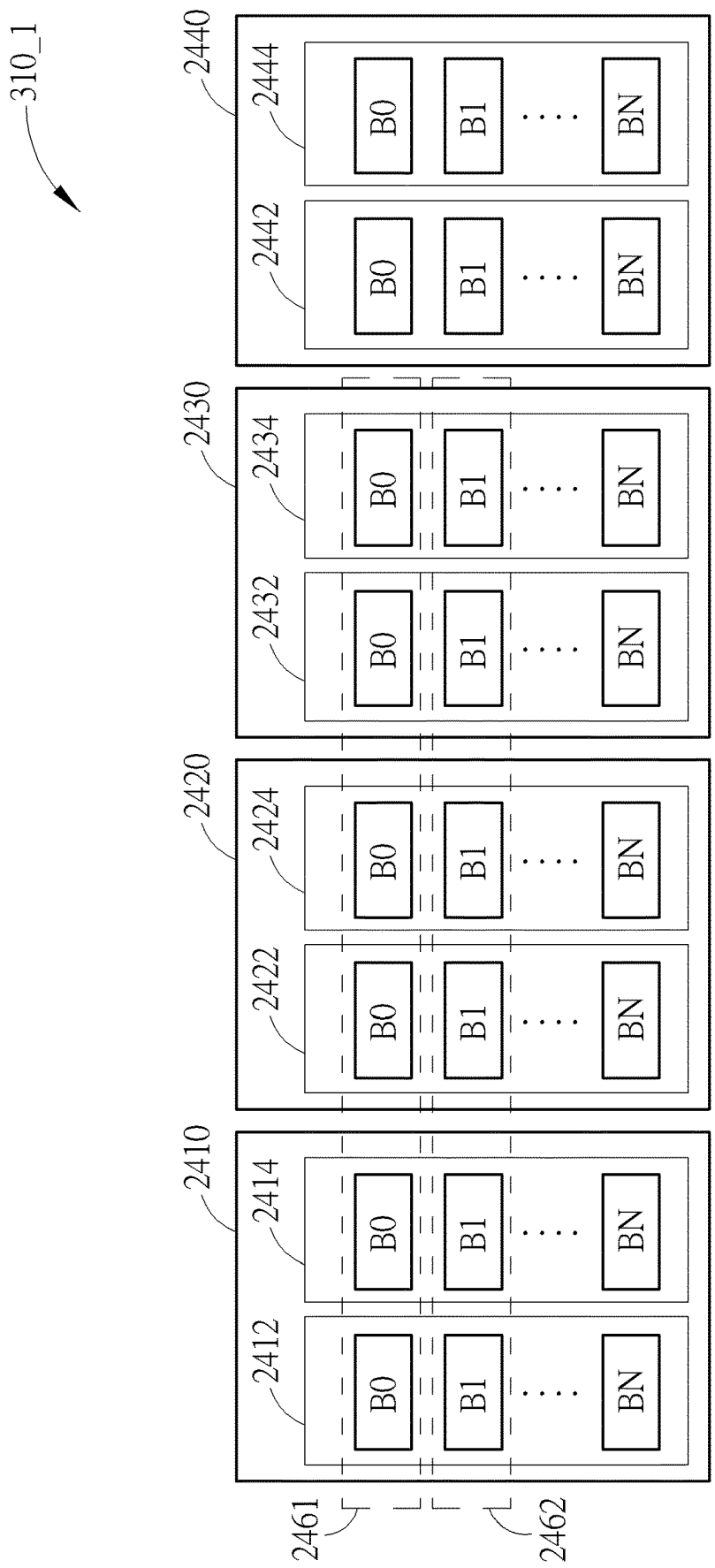
FIG. 24 is a diagram illustrating a super block in the zoned namespace.

It should be noticed that the number of flash memory chips and the number of planes included in each flash memory chip described in the embodiments of FIGS. 22 and 24 are for illustrative purposes only, and are not meant to be limitations of the present invention. In addition, in the embodiment of FIGS. 22 and 24, the flash memory chips 2410, 2420, 2430, 2440 included in the zoned namespace 310_1 and the flash memory chips 2210, 2220, 2230, 2240 included in the general storage space 320_1 can be integrated. Specifically, the flash memory module 124 may only include four flash memory chips 2210, 2220, 2230 and 2240, and the flash memory chips 2210, 2220, 2230 and 2240 as a whole includes the zoned namespace 310_1 and the general storage space 320_1 in FIG. 3. Therefore, the microprocessor 212 can configure the four flash memory chips 2210, 2220, 2230, 2240 as super blocks with different numbers of blocks, such as the super block comprising eight blocks shown in FIG. 22 and the super block containing six blocks shown in FIG. 24.

On the other hand, the general storage space 320_1 shown in FIG. 3 can also be configured as a zoned namespace by the host device 110 at a subsequent time point. At this moment, the size of the previously configured super block in the general storage space 320_1 needs to be changed. In detail, at the first time point, the microprocessor sets the general storage space 320_1 to plan the size of each super block. Taking FIG. 22 as an example, since a super block can include eight blocks at most, the microprocessor 212 sets each super block to include eight blocks. Then, if the host device 110 resets the general storage space 320_1 to the zoned namespace, the microprocessor 212 needs to reset the number of blocks included in each super block, such as six blocks shown in FIG. 22.

Please notice that, in order to improve the access speed of the flash memory controller 122, the data that the host device 110 wants to store into the storage device 120_1 can usually be temporarily stored in the single layer cell (SLC) of the flash memory module 124 (i.e., temporarily stored in the flash memory module 124 in the SLC storage manner), and finally store the data in the multiple level cell (MLC) of the flash memory module 124 (i.e., stored in the flash memory module 124 in the MLC storage manner). In the embodiment of the present invention, the process of storing the data in the flash memory module 124 in the SLC storage mode is omitted, and the state of the final storage in the flash memory module 124 in the MLC storage mode is directly explained. Those skilled in the art can combine the technology of the present invention with the technology of temporarily storing data in the flash memory module 124 in the SLC storage mode under the teaching of the present invention.

Briefly summarizing the present invention, the control method of the present invention applied to the flash memory controller can effectively reduce the size of the L2P mapping table through selecting the access mode of writing the zone data to the flash memory, thereby reducing the burden of buffer memory or DRAM. In addition, by determining the number of blocks included in the super block according to the amount of data in the zone and the size of the physical block, the space of the flash memory module can be more effectively used.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method applied to a flash memory controller, wherein the flash memory controller is configured to access a flash memory module, the flash memory module comprises a plurality of blocks, and each block comprises a plurality of pages; the control method comprising:
   receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones;
   using one of a first access mode, a second access mode, a third access mode and a fourth access mode to write data from the host device to the flash memory module, wherein the data is all data in a specific zone;
   if the first access mode is used:
      writing the data to multiple specific blocks of the flash memory module in sequence according to a sequence of logical addresses of the data; and
      after writing of the data is completed and before a last specific block is erased, writing invalid data to remaining pages of the last specific block of the multiple specific blocks, or keeping the remaining pages blank and not storing data from the host device according to a write command of the host device;
   if the second access mode is used:
      writing the data to the multiple specific blocks of the flash memory module in sequence according to the sequence of the logical addresses of the data, wherein only after writing of the data is completed, the remaining pages of the last specific block are allowed to be written by data in another zone;
   if the third access mode is used:
      writing the data to a single specific blocks of the flash memory module in sequence according to the sequence of the logical addresses of the data; and
      after writing of the data is completed and before the single specific block is erased, writing invalid data to the remaining pages of the single specific block, or keeping the remaining pages blank and not storing data from the host device according to the write command of the host device;
   if the fourth access mode is used:
      writing the data to the single specific block of the flash memory module in sequence according to the sequence of the logical addresses of the data, wherein only after writing of the data is completed, the remaining pages of the single specific block are allowed to be written by data in another zone.

2. The control method of claim 1, wherein the step of using one of the first access mode, the second access mode, the third access mode and the fourth access mode comprises:
   if the size of each zone is greater than a size of each block, using the first access mode or the second access mode; and
   if the size of each zone is smaller than the size of each block, using the third access mode or the fourth access mode.

3. The control method of claim 2, wherein the step of using one of the first access mode, the second access mode, the third access mode and the fourth access mode further comprises:
   if the size of each zone is greater than the size of each block, and a planned capacity of the zoned namespace in the first access mode is greater than a first standard of the host device, using the first access mode;
   if the size of each zone is greater than the size of each block, and the planned capacity of the zoned namespace in the first access mode is smaller than the first standard of the host device, using the second access mode;

if the size of each zone is smaller than the size of each block, and a planned capacity of the zoned namespace in the third access mode is greater than a second standard of the host device, using the third access mode; and if the size of each zone is smaller than the size of each block, and the planned capacity of the zoned namespace in the third access mode is smaller than the second standard of the host device, using the fourth access mode.

4. The control method of claim 1, further comprising:
if the first access mode is used:
if the host device transmits the data and another data with a logical address following a last logical address of the data, writing the another data to another block different from the multiple specific blocks, and not writing the another data to the remaining pages of the last specific block of the multiple specific blocks.

5. The control method of claim 4, wherein if the first access mode is used, a single block only stores data in a single zone, from a perspective of storing the data from the host device.

6. The control method of claim 1, further comprising:
if the second access mode is used:
receiving a first data from the host device, wherein the first data is all data of a first zone;
writing the first data to at least one first specific block and a shared block of the flash memory module in sequence according to a sequence of logical addresses of the first data, wherein a content in the first data that corresponds to a first logical address of the first data is stored in the at least one first specific block, and a content in the first data that corresponds a last logical address of the first data is stored in the shared block;
receiving a second data from the host device, wherein the second data is all data of a second zone; and
writing the second data to at least one second specific block and the shared block of the flash memory module in sequence according to a sequence of logical addresses of the second data.

7. The control method of claim 6, wherein a content of the second data that corresponds to a first logical address of the second data is stored in the at least one second specific block, and a content of the second data that corresponds to a last logical address of the second data is stored in the shared block.

8. The control method of claim 6, wherein from a perspective of storing the data from the host device, the at least one first specific block only stores data corresponding to the first zone, and the at least one second specific block only stores data corresponding to the second zone.

9. The control method of claim 6, wherein the first logical address of the second data follows the last logical address of the first data, and the host device continuously transmits the first data and the second data to the flash memory controller, to request at least a part of the first data and at least a part of the second data be written to the shared block.

10. The control method of claim 1, wherein if the third access mode is used, a single block only stores data in a single zone, from a perspective of storing the data from the host device.

11. The control method of claim 1, wherein:
if the fourth access mode is used:
receiving a first data from the host device, wherein the first data is all data of a first zone;
writing the first data to a shared block in sequence according to a sequence of logical addresses of the first data;
receiving a second data from the host device, wherein the second data is all data of a second zone; and
writing the second data to remaining pages in the shared block in sequence according to a sequence of logical addresses of the second data.

12. The control method of claim 11, wherein if the fourth access mode is used, any block fully filled with data stores data of multiple zones.

13. A flash memory controller, wherein the flash memory controller is configured to access a flash memory module, the flash memory module comprises a plurality of blocks, and each block comprises a plurality of pages; the flash memory controller comprising:
a read only memory, configured to store a code;
a microprocessor, configured to execute the code for controlling access of the flash memory module; and
a buffer memory;
wherein the microprocessor receives a settling command from a host device, the settling command configures at least one portion of the flash memory module as a zoned namespace, the zoned namespace logically comprises a plurality of zones, the host device performs a zone-based data write operation on the zoned namespace, each zone has a same size, logical addresses corresponding to each zone are continuous, and the logical addresses are not overlapping between zones;
wherein the microprocessor uses one of a first access mode, a second access mode, a third access mode and a fourth access mode to write data from the host device to the flash memory module, and the data is all data in a specific zone;
wherein when the microprocessor uses the first access mode:
the microprocessor writes the data to multiple specific blocks of the flash memory module in sequence according to a sequence of logical addresses of the data; and after writing of the data is completed and before a last specific block is erased, the microprocessor writes invalid data to remaining pages of the last specific block of the multiple specific blocks, or keeps the remaining pages blank and does not write data from the host device according to a write command of the host device;
wherein when the microprocessor uses the second access mode:
the microprocessor writes the data to the multiple specific blocks of the flash memory module in sequence according to the sequence of the logical address of the data, wherein only after writing of the data is completed, the remaining pages of the last specific block are allowed to be written by data in another zone;
wherein when the microprocessor uses the third access mode:
the microprocessor writes the data to a single specific block of the flash memory module in sequence according to the sequence of the logical address of the data; and after writing of the data is completed and before the single specific block is erased, the microprocessor writes invalid data to remaining pages of the single specific block, or keeps the remaining pages blank and does not write data from the host device according to the write command of the host device;

wherein when the microprocessor uses the fourth access mode:

the microprocessor writes the data to the single specific block of the flash memory module in sequence according to the sequence of the logical addresses of the data, where only after writing of the data is completed, the remaining pages of the last specific block are allowed to be written by data in another zone.

14. The flash memory controller of claim 13, wherein if the size of each zone is greater than a size of each block, the microprocessor chooses the first access mode or the second access mode; if the size of each zone is smaller than the size of each block, the microprocessor chooses the third access mode or the fourth access mode.

15. The flash memory controller of claim 13, wherein when the first access mode is chosen: if the host device transmits the data and another data with a logical address following a last logical address of the data, the microprocessor writes the another data to another block different from the multiple specific blocks, and does not write the another data to the remaining pages of the last specific block of the multiple specific blocks.

16. The flash memory controller of claim 15, wherein if the first access mode is chose, a single block only stores data in a single zone.

17. The flash memory controller of claim 13, wherein when the microprocessor uses the second access mode, the microprocessor performs following operations: receiving a first data from the host device, wherein the first data is all data of a first zone; writing the first data to at least one first specific block and a shared block of the flash memory module in sequence according to a sequence of logical addresses of the first data, wherein a content in the first data that corresponds to a first logical address of the first data is stored in the at least one first specific block, and a content in the first data that corresponds to a last logical address of the first data is stored in the shared block; receiving a second data from the host device, wherein the second data is all data of a second zone; and writing the second data to at least one second specific block and the shared block of the flash memory module in sequence according to a sequence of logical addresses of the second data, wherein a content of the second data that corresponding to a first logical address of the second data is stored in the at least one second specific block, and a content of the second data that corresponds to a last logical address of the second data is stored in the shared block.

18. A storage device, comprising:
a flash memory module, wherein the flash memory module comprises a plurality of blocks, and each block comprises a plurality of pages; and
a flash memory controller, configured to access the flash memory module;
wherein the flash memory controller receives a settling command from a host device, wherein the settling command configures at least one portion of the flash memory module as a zoned namespace, the zoned namespace logically comprises a plurality of zones, the host device performs a zone-based data write operation on the zoned namespace, each zone has a same size, logical addresses corresponding to each zone are continuous, and the logical addresses are not overlapping between zones;

wherein the flash memory controller uses one of a first access mode, a second access mode, a third access mode and a fourth access mode to write data from the host device to the flash memory module, wherein the data is all data in a specific zone;

wherein when the flash memory controller uses the first access mode:

the flash memory controller writes the data to multiple specific blocks of the flash memory module in sequence according to a sequence of logical addresses of the data; and after writing of the data is completed and before a last specific block is erased, the flash memory controller writes invalid data to remaining pages of a last specific block of the multiple specific blocks, or keeps the remaining pages blank and does not write data from the host device according to a write command of the host device;

wherein when the flash memory controller uses the second access mode:

the flash memory controller writes the data to multiple specific blocks of the flash memory module in sequence according to the sequence of the logical addresses of the data, where only after writing of the data is completed, the remaining pages of the last specific block are allowed to be written by data in another zone;

wherein when the flash memory controller uses the third access mode:

the flash memory controller writes the data to a single specific block of the flash memory module in sequence according to the sequence of the logical address of the data; and after writing of the data is completed and before the single specific block is erased, the flash memory controller writes invalid data to the remaining pages of the single specific block, or keeps the remaining pages blank and does not write data from the host device according to the write command of the host device;

wherein when the flash memory controller uses the fourth access mode:

the flash memory controller writes the data to the single specific block of the flash memory module in sequence according to the sequence of the logical addresses of the data, where only after writing of the data is completed, the remaining pages of the single specific block are allowed to be written by data in another zone.

19. The storage device of claim 18, wherein if the size of each zone is greater than a size of each block, the flash memory controller chooses the first access mode or the second access mode; if the size of each zone is smaller than the size of each block, the flash memory controller chooses the third access mode or the fourth access mode.

20. The storage device of claim 18, wherein when the flash memory controller uses the first access mode, the flash memory controller performs following operations: receiving a first data from the host device, wherein the first data is all data of a first zone; writing the first data to at least one first specific block and a shared block of the flash memory module in sequence according to a sequence of logical addresses of the first data, wherein a content in the first data that corresponds to a first logical address of the first data is stored in the at least one first specific block, and a content in the first data that corresponds to a last logical address of the first data is stored in the shared block; receiving a second data from the host device, wherein the second data is all data of a second zone; and writing the second data to at least one second specific block and the shared block of the flash memory module in sequence according to a sequence of logical addresses of the second data, wherein a content of the second data that corresponds to a first logical address of the second data is stored in the at least one second specific block, and a content of the second data that corresponds to a last logical address of the second data is stored in the shared block.

\* \* \* \* \*